(12) United States Patent
Oki

(10) Patent No.: US 7,586,820 B2
(45) Date of Patent: Sep. 8, 2009

(54) METHOD OF DETECTING SYNC SIGNALS

(75) Inventor: Tsuyoshi Oki, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 666 days.

(21) Appl. No.: 11/264,015

(22) Filed: Nov. 2, 2005

(65) Prior Publication Data

US 2006/0098544 A1 May 11, 2006

(30) Foreign Application Priority Data

Nov. 10, 2004 (JP) .............................. 2004-325869
Sep. 6, 2005 (JP) .............................. 2005-257532

(51) Int. Cl.
*G11B 7/00* (2006.01)
(52) U.S. Cl. .............. 369/47.28; 369/47.35; 369/53.15; 369/53.34
(58) Field of Classification Search .............. 369/53.15, 369/53.34, 47.28, 47.35
See application file for complete search history.

(56) References Cited

U.S. PATENT DOCUMENTS

| | | | |
|---|---|---|---|
| 5,604,723 A * | 2/1997 | Kikuta | 369/47.32 |
| 7,209,641 B2 * | 4/2007 | Noro | 386/84 |
| 7,317,679 B2 * | 1/2008 | Noda et al. | 369/275.3 |
| 2002/0172111 A1 * | 11/2002 | Tsai et al. | 369/47.28 |
| 2004/0179446 A1 * | 9/2004 | Nagai et al. | 369/47.28 |
| 2005/0135211 A1 * | 6/2005 | Hu et al. | 369/47.28 |
| 2005/0141374 A1 * | 6/2005 | Mihara et al. | 369/47.28 |

FOREIGN PATENT DOCUMENTS

JP          05-151708          6/1993

OTHER PUBLICATIONS

Machine translation of japan publication 05151708 by Yamauchi Toshiyuki on Jun. 18, 1993.*

* cited by examiner

*Primary Examiner*—Wayne R Young
*Assistant Examiner*—Linh T Nguyen
(74) *Attorney, Agent, or Firm*—Louis Woo

(57) ABSTRACT

A pattern of an input sync signal is compared with sub patterns in a first sync pattern. The sub patterns in the first sync pattern are equal to the patterns of true sync signals, respectively. When the pattern of the input sync signal agrees with none of the sub patterns in the first sync pattern, the pattern of the input sync signal is compared with sub patterns in a second sync pattern. The sub patterns in the second sync pattern have temporal fluctuations with respect to the patterns of the true sync signals. Each of the sub patterns in the second sync pattern is assigned to only one of the true sync signals. It is determined that a sync signal is detected when the pattern of the input sync signal agrees with one of the sub patterns in the first and second sync patterns.

15 Claims, 23 Drawing Sheets

FIG. 25

| | SYNC SIGNAL SY1 | SYNC SIGNAL SY2 | SYNC SIGNAL SY3 | SYNC SIGNAL SY4 |
|---|---|---|---|---|
| FIRST SYNC PATTERN | 0-16-26 | 0-18-28 | 0-20-30 | 0-22-32 |
| SECOND SYNC PATTERN | 0-15-25<br>0-17-26<br>0-16-27<br>0-16-25<br>0-15-26 | 0-19-28<br>0-18-29<br>0-18-27<br>0-17-28 | 0-21-30<br>0-20-31<br>0-20-29<br>0-19-30 | 0-23-32<br>0-22-33<br>0-22-31<br>0-23-33<br>0-21-32 |
| THIRD SYNC PATTERN | 0-17-27 | 0-17-27<br>0-19-29 | 0-19-29<br>0-21-31 | 0-21-31 |

METHOD OF DETECTING SYNC SIGNALS

BACKGROUND OF THE INVENTION

1. Field of the Invention

This invention generally relates to a method of detecting sync signals. This invention particularly relates to a method of reproducing sync signals with different patterns from a recording medium, and generating a data-reading timing signal in response to the reproduced sync signals.

2. Description of the Related Art

Some optical discs such as a CD-R (Compact Disc-Recordable) and a CD-RW (Compact Disc-Rewritable) have a track formed by a groove which wobbles at a spatial frequency corresponding to 22.05 kHz. The wobble is the recording of information (wobbling information) of different types which contains 22.05-kHz information and phase-modulated address information representing the absolute position of every point on the track. The address information is called ATIP (absolute time in pre-groove). The wobbling information can be used as tracking and timing information.

A drive apparatus for such an optical disc includes an optical pickup which applies a spot of light to a track on the optical disc. The applied light is reflected at the surface of the optical disc, and there occurs reflected light inclusive of wobbling information. A portion of the reflected light returns to the optical pickup. The optical pickup converts the return light into a corresponding electric signal. The drive apparatus detects the wobbling information from the electric signal generated by the optical pickup. During a recording or playback mode of operation, the drive apparatus uses the detected wobbling information as a signal for controlling the rotation of the optical disc and also a signal for generating a reference clock signal.

Other optical discs such as a DVD-R (Digital Versatile Disc-Recordable) and a DVD-RW (Digital Versatile Disc-Rewritable) have a track with a wobble recorded on a non-modulation basis and designed to provide 140-kHz clock information. In these optical discs, address information is previously recorded as pre-pits in a land portion between adjacent groove portions.

In the case of an optical disc in which address information and a sync signal for detecting the address information are represented by a phase-modulated wobble of a track, a first example is designed so that "0" and "1" in the address information are expressed through inversion of the phase of wobbling information. In a second example, "0" and "1" in the address information and the sync signal are expressed by different patterns resulting from combining basic wobbles of different phases. The modulated phase information is recovered by subjecting reproduced wobbling information to synchronous detection in response to a clock signal extracted from the reproduced wobbling information.

Generally, address information recorded on an optical disc is based on time sharing, and accurate detection of a sync signal preceding the address information is required for correct recovery of the address information.

Japanese patent application publication number 5-151708/1993 discloses a synchronization protecting device designed to compensate for synchronization discontinuities caused by random code errors and burst errors, and to prevent false synchronization due to pseudo synchronization patterns and to rapidly restore synchronization right after a head switching. The device of Japanese application 5-151708/1993 has a structure for accurately detecting a sync signal pattern.

Specifically, the device of Japanese application 5-151708/1993 includes a sync pattern detection circuit, a first sync protection circuit, and a second sync protection circuit. The sync pattern detection circuit compares a prescribed number of current successive bits in an input digital signal with bits of a true sync signal pattern. When all the current successive bits in the input digital signal match with the bits of the true sync signal pattern, the sync pattern detection circuit outputs a sync pattern detection signal "A". When only one of the current successive bits differs from corresponding one of the bits of the true sync signal pattern, the sync pattern detection circuit outputs a sync pattern detection signal "B". The first sync protection circuit decides whether or not the sync pattern detection signal "A" is repetitively outputted at a correct period, that is, whether or not the synchronization is established. This decision is carried out by comparing the sync pattern detection signal "A" with a repetitively-generated internal sync signal. In the case where the synchronization goes unestablished and is thereafter re-established, the first sync protection circuit outputs a first pulse signal in response to the re-establishment of the synchronization. The second sync protection circuit decides whether or not the sync pattern detection signal "B" is repetitively outputted at a correct period. This decision is carried out by comparing the sync pattern detection signal "B" with a repetitively-generated internal sync signal. While the sync pattern detection signal "B" remains repetitively outputted at the correct period, the second sync protection circuit repetitively outputs a second pulse signal at the same period as a detection-result sync signal. When the first pulse signal is outputted from the first sync protection circuit, the second sync protection circuit outputs a detection-result sync signal synchronized with the first pulse signal.

As the information recording density of an optical disc increases, the track pitch thereof decreases. A smaller track pitch causes a drop in S/N (signal-to-noise ratio) or C/N (carrier-to-noise ratio) regarding the detection of a timing signal or a sync signal from a wobble of a track on the optical disc. In addition, a smaller track pitch increases cross talk between wobbles of adjacent track portions regarding the reproduction of information from the optical disc. -The increased cross talk deteriorates reproduced wobbling information, and causes false inversion of the phase of the reproduced wobbling information. As a result of these factors, there is a chance that a reproduced sync signal will have a bit shift from the original and that the accuracy of the detection of a sync signal will drop to an unacceptable range and hence the correct recovery of the wobbling information in response to the detected sync signal will be unfeasible. Basically, these problems can not be solved by the above-mentioned device of Japanese application 5-151708/1993. Similar problems may occur due to degradation of the optical disc.

SUMMARY OF THE INVENTION

It is an object of this invention to provide a method of properly detecting sync signals even when sync signals which have just been reproduced are with bit shifts.

A first aspect of this invention provides a method of detecting sync signals having different patterns respectively. The method comprises the steps of a) comparing a pattern of an input sync signal with sub patterns in a first sync pattern to determine whether or not the pattern of the input sync signal agrees with one of the sub patterns in the first sync pattern, wherein the sub patterns in the first sync pattern are equal to the patterns of the sync signals respectively; b) in a case where the step a) determines that the pattern of the input sync signal agrees with none of the sub patterns in the first sync pattern, comparing the pattern of the input sync signal with sub patterns in a second sync pattern to determine whether or not the pattern of the input sync signal agrees with one of the sub patterns in the second sync pattern, wherein the sub patterns in the second sync pattern have temporal fluctuations with respect to the patterns of the sync signals, and each of the sub patterns in the second sync pattern is assigned to only one of the sync signals; and c) determining that a sync signal is detected in one of (1) a case where the step a) determines that the pattern of the input sync signal agrees with one of the sub patterns in the first sync pattern and (2) a case where the step b) determines that the pattern of the input sync signal agrees with one of the sub patterns in the second sync pattern.

A second aspect of this invention is based on the first aspect thereof, and provides a method further comprising the steps of d) in a case where the step a) determines that the pattern of the input sync signal agrees with none of the sub patterns in the first sync pattern and the step b) determines that the pattern of the input sync signal agrees with none of the sub patterns in the second sync pattern, comparing the pattern of the input sync signal with sub patterns in a third sync pattern to determine whether or not the pattern of the input sync signal agrees with one of the sub patterns in the third sync pattern, wherein the sub patterns in the third sync pattern have temporal fluctuations with respect to the patterns of the sync signals, and each of the sub patterns in the third sync pattern is assigned in common to at least two of the sync signals; e) estimating a sync signal to be detected; and f) determining that a sync signal is detected in a case where the step d) determines that the pattern of the input sync signal agrees with one of the sub patterns in the third sync pattern and the sync signal estimated by the step e) is equal to the sync signal to which said one of the sub patterns in the third sync pattern is assigned.

A third aspect of this invention is based on the first aspect thereof, and provides a method further comprising the steps of d) determining whether synchronization is in a locked state or an unlocked state in response to a result of the determining by the step c); and e) performing the step a) when the step d) determines that the synchronization is in the locked state.

A fourth aspect of this invention is based on the second aspect thereof, and provides a method further comprising the steps of g) determining whether synchronization is in a locked state or an unlocked state in response to a result of the determining by the step c); and h) performing the step a) when the step g) determines that the synchronization is in the locked state.

A fifth aspect of this invention is based on the first aspect thereof, and provides a method further comprising the step of reproducing a sync signal from a recording medium to get the input sync signal, wherein the recording medium comprises an optical recording medium, and sync signals are recorded on the optical disc as a wobble of a track.

A sixth aspect of this invention is based on the third aspect thereof, and provides a method further comprising the step of generating a timing signal for reading data following the input sync signal in response to a result of the determining by the step c) and a result of the determining by the step d).

A seventh aspect of this invention is based on the fourth aspect thereof, and provides a method further comprising the step of generating a timing signal for reading data following the input sync signal in response to a result of the determining by the step c) and a result of the determining by the step g).

An eighth aspect of this invention is based on the third aspect thereof, and provides a method further comprising the steps of f) determining whether or not a sync signal has been detected when the step d) determines that the synchronization is in the unlocked state; g) in a case where the step f) determines that a sync signal has not been detected, comparing the pattern of the input sync signal with the sub patterns in the first sync pattern to determine whether or not the pattern of the input sync signal agrees with one of the sub patterns in the first sync pattern; h) determining that a sync signal is detected in a case where the step g) determines that the pattern of the input sync signal agrees with one of the sub patterns in the first sync pattern; and i) determining that a sync signal is not detected in a case where the step g) determines that the pattern of the input sync signal agrees with none of the sub patterns in the first sync pattern.

A ninth aspect of this invention is based on the eighth aspect thereof, and provides a method further comprising the step of performing the step a) in a case where the step f) determines that a sync signal has been detected.

A tenth aspect of this invention is based on the third aspect thereof, and provides a method wherein the step d) comprises determining that the synchronization is in the locked state in a case where results of the determining by the step c) indicate that a prescribed number of successive sync signals are detected, and otherwise determining that the synchronization is in the unlocked state.

An eleventh aspect of this invention is based on the third aspect thereof, and provides a method wherein the step d) comprises determining that the synchronization is in the locked state in a case where results of the determining by the step c) indicate that a prescribed number of sync signals are detected in a preset time, and otherwise determining that the synchronization is in the unlocked state.

A twelfth aspect of this invention is based on the third aspect thereof, and provides a method further comprising the steps of f) determining whether or not a sync signal has been detected when the step d) determines that the synchronization is in the unlocked state; and g) performing the step a) when the step f) determines that a sync signal has been detected.

A thirteenth aspect of this invention is based on the third aspect thereof, and provides a method further comprising the steps of f) in a case where the step d) determines that the synchronization is in the unlocked state, comparing the pattern of the input sync signal with the sub patterns in the first sync pattern to determine whether or not the pattern of the input sync signal agrees with one of the sub patterns in the first sync pattern; g) determining that a sync signal is detected in a case where the step f) determines that the pattern of the input sync signal agrees with one of the sub patterns in the first sync pattern; and h) determining that a sync signal is not detected in a case where the step f) determines that the pattern of the input sync signal agrees with none of the sub patterns in the first sync pattern.

A fourteenth aspect of this invention is based on the first aspect thereof, and provides a method further comprising the steps of d) determining whether at least one sync signal has been detected; and e) performing the step a) when the step d) determines that at least one sync signal has been detected.

A fifteenth aspect of this invention is based on the eighth aspect thereof, and provides a method further comprising the steps of j) performing the step a) in a case where the step f) determines that a sync signal has been detected; k) estimating a sync signal to be detected; l) inhibiting the step c) from determining that a sync signal is detected in a case where the sync signal estimated by the step k) is different from the sync signal to which said one of the sub patterns in the second sync pattern is assigned; and m) determining that a sync signal is not detected in a case where the sync signal estimated by the step k) is different from the sync signal to which said one of the sub patterns in the second sync pattern is assigned.

A sixteenth aspect of this invention is based on the third aspect thereof, and provides a method further comprising the steps of f) determining whether or not a sync signal has been detected when the step d) determines that the synchronization is in the unlocked state; g) performing the step a) in a case where the step f) determines that a sync signal has been detected; and h) determining that a sync signal is not detected in a case where the step b) determines that the pattern of the input sync signal agrees with none of the sub patterns in the second sync pattern.

This invention provides advantages as follows. The sub patterns in the first sync pattern are exactly equal to the patterns of the plural different sync signals, respectively. There is the second sync pattern in addition to the first sync pattern. The sub patterns in the second sync pattern are designed to allow temporal fluctuations (bit shifts) with respect to the patterns of the plural different sync signals. Such temporal fluctuations (bit shifts) are caused by, for example, poor wobbling-information detecting conditions. The pattern of every incoming sync signal is collated with the sub patterns in the first and second sync patterns. The result of the collation is used for determining whether or not a sync signal is successfully detected, and determining whether the synchronization is in the locked state or the unlocked state. Even when the pattern of an incoming sync signal has an allowable temporal fluctuation (bit shift), the incoming sync signal can be recognized as a true sync signal. Accordingly, incoming sync signals with allowable temporal fluctuations (bit shifts) are prevented from being overlooked. Thus, it is possible to enhance the accuracy and reliability of the generation of a timing signal in response to the detection of incoming sync signals.

Factors such as cross talk between wobbles of adjacent track portions in an optical disc, and degradation of the optical disc cause temporal fluctuations (bit shifts) in the patterns of incoming sync signals. In addition, they cause distortion of reproduced wobbling information and false inversion of the phase of the reproduced wobbling information. Even under such poor conditions, it is possible to accurately determine whether the synchronization is in the locked state or the unlocked state. Furthermore, it is possible to accurately and stably demodulate the contents of the wobbling information.

BRIEF DESCRIPTION OF THE DRAWINGS

FIG. 25 is a diagram of sub patterns in first, second, and third sync patterns which are assigned to the sync signals in the ninth embodiment of this invention.

DETAILED DESCRIPTION OF THE INVENTION

First Embodiment

Figure 1:
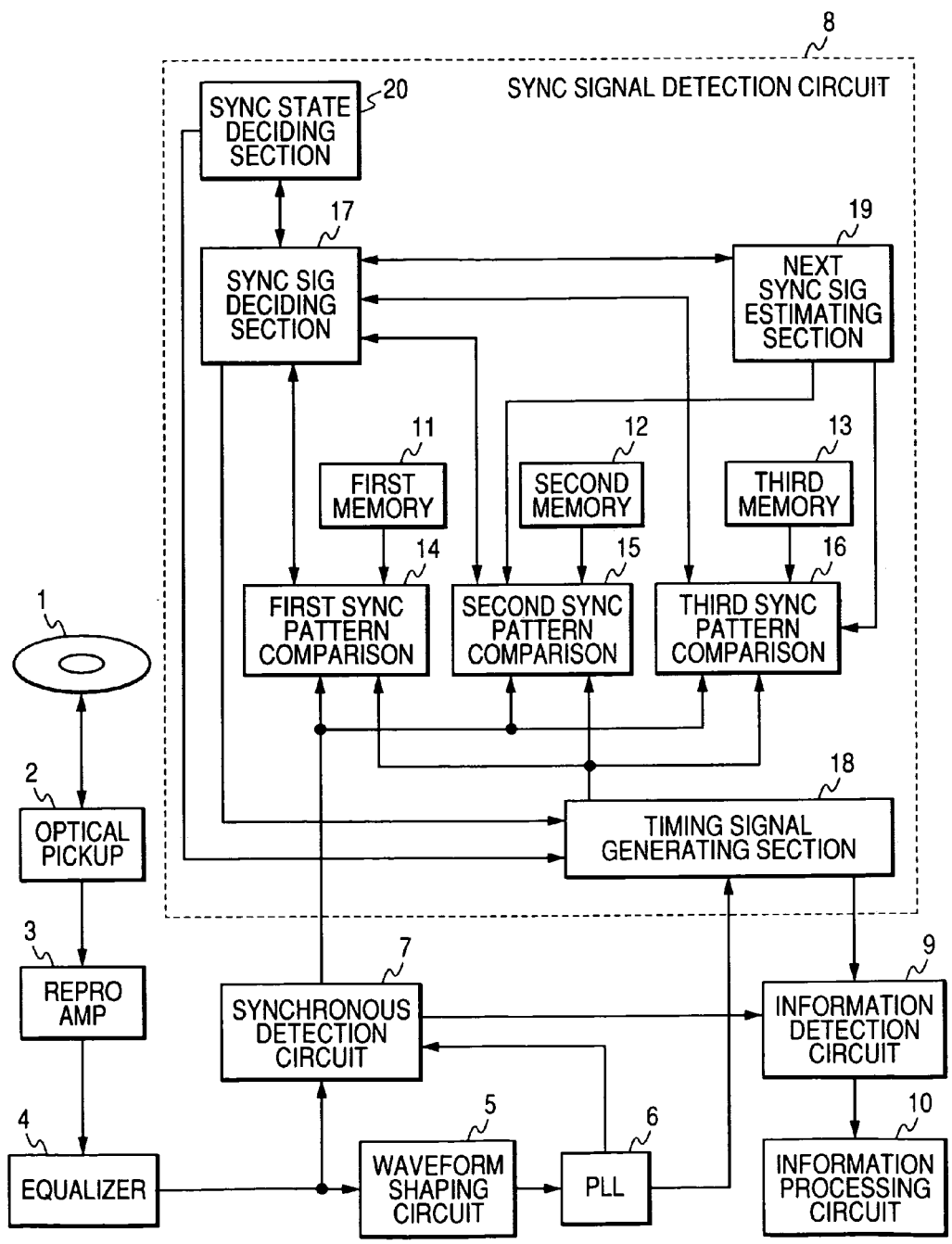
FIG. 1 is a block diagram of an optical-disc drive apparatus including a sync signal detection circuit according to a first embodiment of this invention.

FIG. 1 shows an optical-disc drive apparatus including a sync signal detection circuit 8 according to a first embodiment of this invention.

With reference to FIG. 1, an optical disc 1 has a groove and a land. The groove extends spirally from the innermost circumference to the outermost circumference of the optical disc 1. The land continuously extends along a side of the groove. Thus, the land is also spiral. As viewed along a radial direction of the optical disc 1, portions of the groove alternate with portions of the land. A track is formed along the groove. The groove or the sides of the land are wobbled on a modulated basis to represent wobbling information. In a prescribed area of the optical disc 1, on-disc address information and basic information representative of recording and reproducing conditions are recorded as wobbling information.

It should be noted that the optical disc 1 may have concentric grooves and concentric lands instead of a spiral groove and a spiral land.

Figure 2:
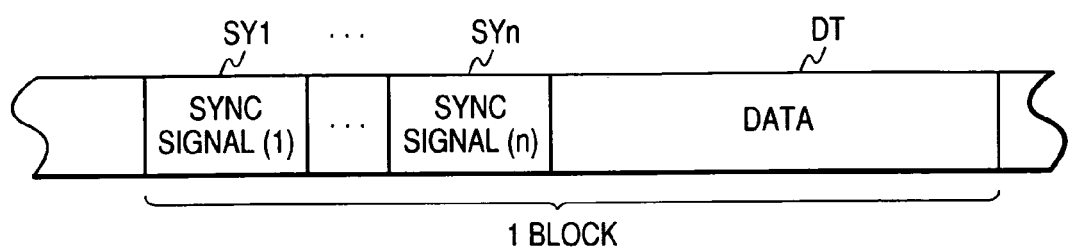
FIG. 2 is a diagram of the structure of one block of wobbling information in the first embodiment of this invention.

As shown in FIG. 2, the wobbling information recorded on the optical disc 1 as the modulated wobble of the groove is divided into blocks each having data DT and a plurality of sync signals SY1-SYn where "n" denotes a predetermined natural number equal to or greater than 2. The blocks correspond to unit times, respectively. The data DT contains on-disc address information and basic information. The sync signals SY1-SYn are successively arranged. The sync signals SY1-SYn are located at positions preceding the position of the data DT. Accordingly, the data DT is referred to as the post-sync data DT also. The sync signals SY1-SYn are used for the detection of the data DT. The sync signals SY1-SYn have different patterns (different bit sequence patterns), respectively.

With reference back to FIG. 1, the optical-disc drive apparatus includes an optical pickup 2 for applying a laser beam to the optical disc 1. The optical-disc drive apparatus includes a spindle motor (not shown) for rotating the optical disc 1. During operation of the optical-disc drive apparatus, the track on the optical disc 1 is scanned by the applied laser beam while the optical disc 1 is rotated. The applied laser beam is reflected by the optical disc 1. A portion of the reflected laser beam returns to the optical pickup 2. The return laser beam contains the wobbling information recorded on the optical disc 1. The optical pickup 2 changes the return laser beam into a corresponding electric read signal through photoelectric conversion. The read signal is sent from the optical pickup 2 to a reproducing amplifier 3. The read signal is enlarged by the reproducing amplifier 3 before being fed to an equalizer 4.

The equalizer 4 subjects the read signal to prescribed waveform equalization to suppress inter-symbol interference caused by a waveform distortion of the read signal. The equalizer 4 outputs the equalization-result signal to a waveform shaping circuit 5 and a synchronous detection circuit 7.

The waveform shaping circuit 5 processes the output signal of the equalizer 4 into a pulse signal through a waveform shaping action. The waveform shaping circuit 5 outputs the pulse signal to a PLL (phase locked loop) 6. The PLL 6 generates a basic frequency signal (a basic clock signal) phase-locked with the pulse signal from the waveform shaping circuit 5. The generated basic frequency signal is synchronized with the wobble of the groove in the optical disc 1 which is scanned by the laser beam. The PLL 6 outputs the basic frequency signal (the basic clock signal) to the synchronous detection circuit 7 and the sync signal detection circuit 8.

The synchronous detection circuit 7 samples the wobbling information in the output signal of the equalizer 4 in response to the basic clock signal from the PLL 6, and thereby implements synchronous detection to generate synchronous-detection-result data containing the wobbling information and representing wobble patterns and MSK (minimum shift keying) mark detection patterns for sync signals. The wobbling information includes data DT following sync signals. The synchronous detection circuit 7 outputs the synchronous-detection-result data to the sync signal detection circuit 8 and an information detection circuit 9. Basically, the synchronous detection circuit 7 detects MSK (minimum shift keying) marks in the output signal of the equalizer 4 through synchronous detection responsive to the basic clock signal from the PLL 6, and repetitively generates a signal representative of an MSK mark detection pattern formed by the detected MSK marks. The synchronous detection circuit 7 outputs the signal representative of the MSK mark detection pattern to the sync signal detection circuit 8. Preferably, for every detected sync signal, the synchronous detection circuit 7 outputs the signal representative of the MSK mark detection pattern immediately after or just when detecting the last one of MSK marks in the sync signal.

The sync signal detection circuit 8 detects patterns of incoming sync signals in response to the wobble patterns represented by the synchronous-detection-result data. Thus, the sync signal detection circuit 8 detects a plurality of sync signals in the synchronous-detection-result data. In response to the detection of the sync signals, the sync signal detection circuit 8 generates a timing signal for reading post-sync data such as data DT following the sync signals. The sync signal detection circuit 8 outputs the generated timing signal to the information detection circuit 9.

The information detection circuit 9 detects the post-sync data DT in the synchronous-detection-result data in response to the timing signal. The information detection circuit 9 outputs the detected data DT to an information processing circuit 10. The information processing circuit 10 processes the detected data DT to recover original information represented by the detected data DT.

The sync signal detection circuit 8 includes a first memory section 11, a second memory section 12, a third memory section 13, a first sync pattern comparing section 14, a second sync pattern comparing section 15, and a third sync pattern comparing section 16.

As previously mentioned, for every block of the wobbling information recorded on the optical disc 1, there is a plurality of successively-arranged sync signals having different patterns respectively. The first memory section 11 in the sync signal detection circuit 8 stores a first sync pattern having sub patterns exactly equal to the patterns of the sync signals respectively. The second memory section 12 stores a second sync pattern which allows temporal fluctuations (bit shifts) with respect to the first sync pattern or with respect to the patterns of the sync signals, and which has sub patterns each assigned to one of the sync signals and hence capable of identifying one of the sync signals. The third memory section 13 stores a third sync pattern which allows temporal fluctuations (bit shifts) with respect to the first sync pattern or with respect to the patterns of the sync signals, and which has sub patterns each assigned to or corresponding to two or more of the sync signals.

The first sync pattern comparing circuit 14 in the sync signal detection circuit 8 receives the synchronous-detection-result data from the synchronous detection circuit 7. The first sync pattern comparing circuit 14 compares every sync signal pattern in the wobbling information in the synchronous-detection-result data with the first sync pattern stored in the first memory section 11 to decide whether or not the two patterns match with each other. The second sync pattern comparing circuit 15 receives the synchronous-detection-result data from the synchronous detection circuit 7. The second sync pattern comparing circuit 15 compares every sync signal pattern in the wobbling information in the synchronous-detection-result data with the second sync pattern stored in the second memory section 12 to decide whether or not the two patterns match with each other. The third sync pattern comparing circuit 16 receives the synchronous-detection-result data from the synchronous detection circuit 7. The third sync pattern comparing circuit 16 compares every sync signal pattern in the wobbling information in the synchronous-detection-result data with the third sync pattern stored in the third memory section 13 to decide whether or not the two patterns match with each other.

The sync signal detection circuit 8 further includes a sync signal deciding section 17, a timing signal generating section 18, a next sync signal estimating section 19, and a synchronization state deciding section 20.

The sync signal deciding section 17 in the sync signal detection circuit 8 decides whether or not sync signals are successfully received (detected) on the basis of the results of the comparison by the first, second, and third sync pattern comparing sections 14, 15, and 16, and the result of a decision by the synchronization state deciding section 20. As will be mentioned later, the result of the decision by the synchronization state deciding section 20 indicates whether the synchronization is in a locked state or an unlocked state. The timing signal generating section 18 produces a first timing signal and a second timing signal in response to the results of the decision by the sync signal deciding section 17 and the synchronization state deciding section 20, and in response to the sync signals decided to be successfully received (detected). The first timing signal represents a timing (a detection window) at which a next sync signal should be detected. The second timing signal represents a timing at which the data DT following the sync signals should be detected. The timing signal generating section 18 feeds the first timing signal to the first, second, and third sync pattern comparing sections 14, 15, and 16. The timing signal generating section 18 feeds the second timing signal to the information detection circuit 9.

The next sync signal estimating section 19 in the sync signal detection circuit 8 estimates a next sync signal to be detected at a next sync signal detection timing in response to the result of the decision by the sync signal deciding section 17 and the sync signals decided to be successfully received. The next sync signal estimating section 19 loads the estimated next sync signal into the second and third sync pattern comparing sections 15 and 16. The synchronization state deciding section 20 includes a synchronization-locked-state deciding counter and a synchronization-unlocked-state deciding counter. The synchronization state deciding section 20 increments or resets the values (the counter values) represented by these counters in response to the result of the decision by the sync signal deciding section 17. The synchronization state deciding section 20 makes a decision as to whether or not the synchronization is in the locked state or the unlocked state on the basis of the counter values.

Figure 3:
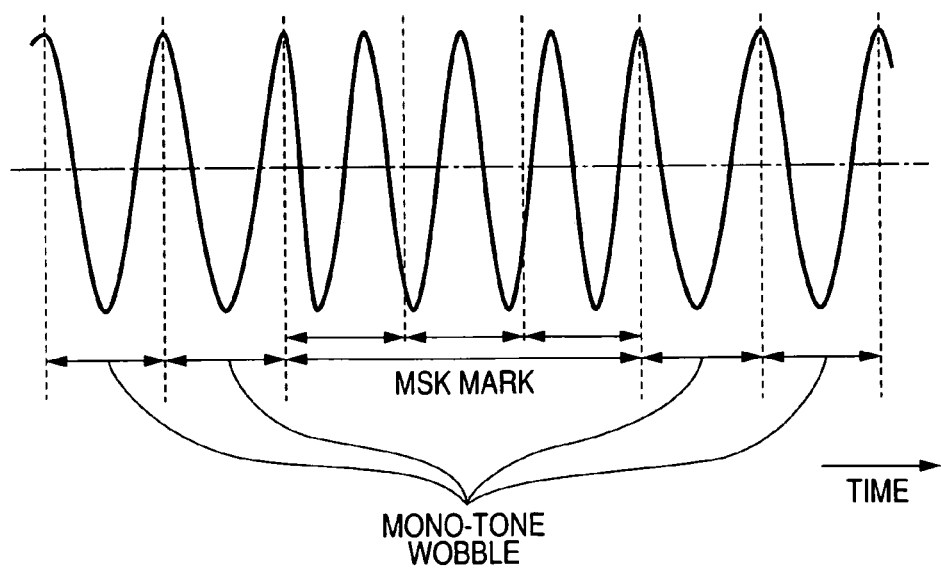
FIG. 3 is a time-domain diagram of waveform conditions of modulation of a wobble in the first embodiment of this invention.

As previously mentioned, the optical disc 1 has the recording of the wobble of the groove. With reference to FIG. 3, the recorded wobble results from modulation of a fundamental wobble wave, that is, a mono-tone wobble wave (a carrier). Specifically, there is an MSK (minimum shift keying) mark repetitively inserted into the mono-tone wobble wave. Each MSK mark has a time length corresponding to 3 periods of the mono-tone wobble wave. Each MSK mark is composed of first, second, and third waves sequentially connected and occupying the first, second, and third 1-period-corresponding time ranges respectively. The second wave (the center wave) in the MSK mark is equal in frequency to the mono-tone wobble wave, and has a phase different from that of the mono-tone wobble wave by 180°. The first and third waves in the MSK mark have a frequency equal to 1.5 times the frequency of the mono-tone wobble wave, and have phases different from each other by 180°. Accordingly, the modulated wobble has a combination of mono-tone wobble wave portions (fundamental wobble wave portions) and MSK marks which represents wobbling information inclusive of sync signals and on-disc address information.

Figure 4:
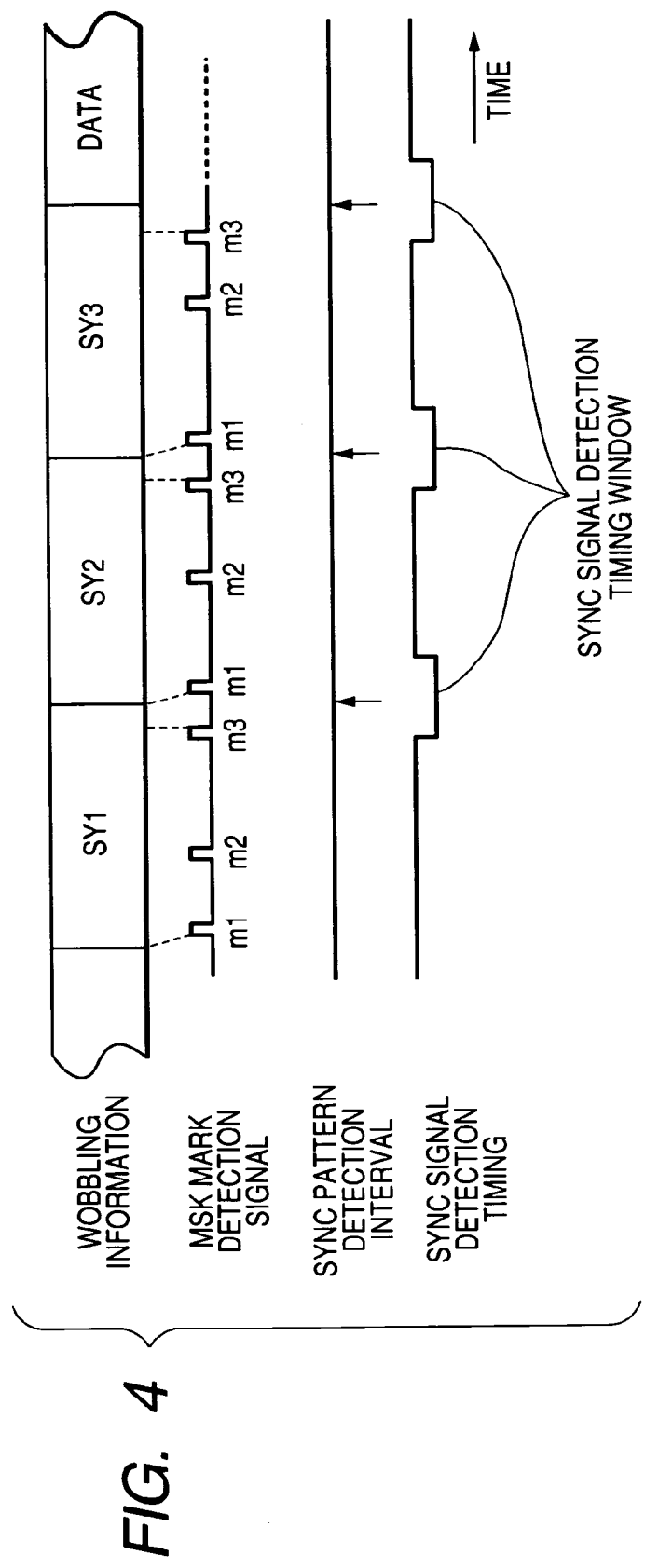
FIG. 4 is a time-domain diagram of wobbling information, MSK mark detection signals, sync-pattern detection intervals, and sync-signal detection timings in the first embodiment of this invention.

With reference to FIG. 4, every block of wobbling information has successively-arranged sync signals SY1, SY2, and SY3 which are followed by data DT. Each of the sync signals SY1, SY2, and SY3 has three MSK marks m1, m2, and m3. The sync signals SY1, SY2, and SY3 are different in relation among the time positions of the MSK marks m1, m2, and m3. A binary signal resulting from the detection of MSK marks takes a waveform shown in FIG. 4. Intervals of the detection of sync signals are provided as shown in FIG. 4. Sync signal detection timing windows are provided as shown in FIG. 4.

Figures 5, 6:
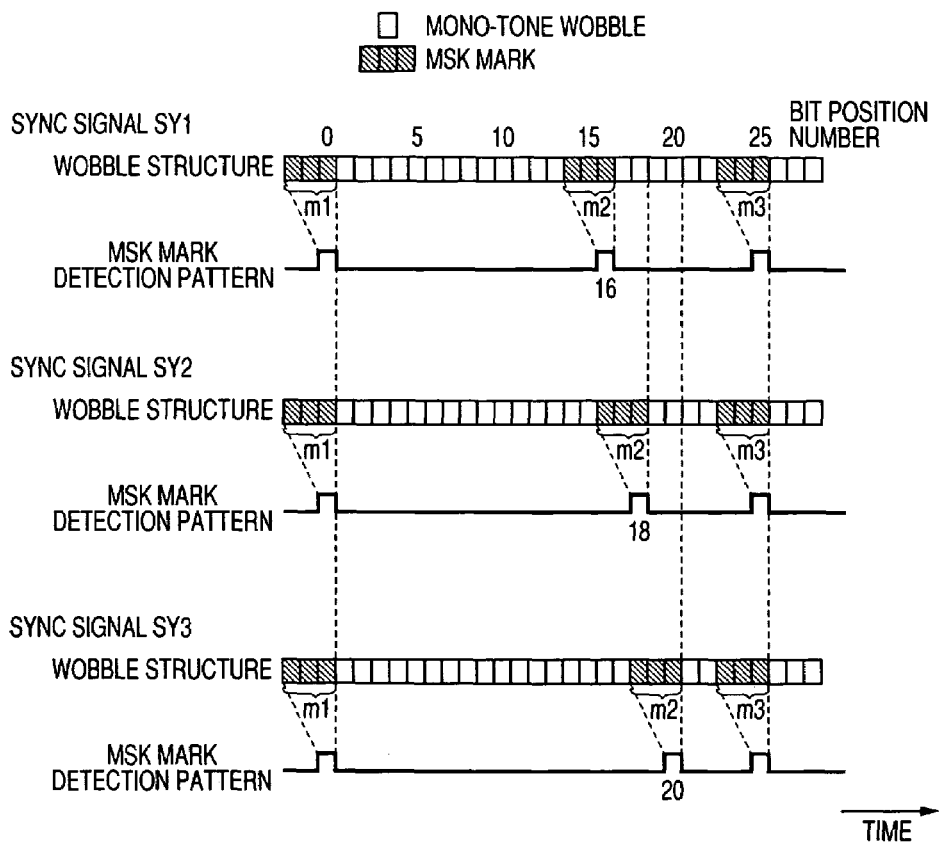
FIG. 5 is a time-domain diagram of the relation among sync signals, MSK marks, mono-tone wobble waves, and MSK mark detection patterns in the first embodiment of this invention.
FIG. 6 is a diagram of sub patterns in first, second, and third sync patterns which are assigned to the sync signals in the first embodiment of this invention.

As shown in FIG. 5, each of the sync signals SY1, SY2, and SY3 is composed of mono-tone wobble wave portions (fundamental wobble wave portions) and MSK marks m1, m2, and m3. Each of the sync signals SY1, SY2, and SY3 has a fixed length corresponding to, for example, 28 bits. Each of the MSK marks m1, m2, and m3 has 3 bits. The head of each of the sync signals SY1, SY2, and SY3 is occupied by the MSK mark m1 while the end thereof is occupied by the MSK mark m3. In each of the sync signals SY1, SY2, and SY3, a first mono-tone wobble wave portion extends between the MSK marks m1 and m2, and a second mono-tone wobble wave portion extends between the MSK marks m2 and m3. The sync signals SY1, SY2, and SY3 are different in time position of the MSK mark m2. Specifically, the MSK mark m2 in the sync signal SY1 occupies the 14th, 15th, and 16th bit positions. The MSK mark m2 in the sync signal SY2 occupies the 16th, 17th, and 18th bit positions. The MSK mark m2 in the sync signal SY3 occupies the 18th, 19th, and 20th bit positions. Each of the MSK marks m1, m2, and m3 represents a bit sequence of "001". Every bit represented by the mono-tone wobble wave portions is "0". Thus, the sync signals SY1, SY2, and SY3 have different bit sequence patterns respectively. The order in which the sync signals SY1, SY2, and SY3 are recorded and reproduced is previously determined.

It should be noted that there may be sync signals SY1-SYn more than three sync signals SY1-SY3.

The synchronous detection circuit 7 in FIG. 1 serves to detect every MSK mark in the output signal of the equalizer 4. Upon the detection of every MSK mark, the synchronous detection circuit 7 outputs an MSK mark detection signal which takes a prescribed logical value for the third 1-bit-corresponding time range in the MSK mark duration. The last three MSK mark detection signals constitute an MSK mark detection pattern. MSK mark detection patterns for the sync signals SY1-SY3, that is, patterns formed by outputted MSK mark detection signals for the sync signals SY1-SY3, are shown in FIG. 5.

Specifically, for the sync signal SY1, MSK mark detection signals are outputted at the 0th bit position, the 16th bit position, and the 25th bit position respectively (see FIG. 5). Thus, an MSK mark detection pattern, that is, a pattern formed by the outputted MSK mark detection signals, is denoted by "0-16-25".

For the sync signal SY2, MSK mark detection signals are outputted at the 0th bit position, the 18th bit position, and the 25th bit position respectively (see FIG. 5). Thus, an MSK mark detection pattern, that is, a pattern formed by the outputted MSK mark detection signals, is denoted by "0-18-25".

For the sync signal SY3, MSK mark detection signals are outputted at the 0th bit position, the 20th bit position, and the 25th bit position respectively (see FIG. 5). Thus, an MSK mark detection pattern, that is, a pattern formed by the outputted MSK mark detection signals, is denoted by "0-20-25".

As shown in FIG. 6, first, second, and third sync patterns are provided in connection with the sync signals SY1-SY3. The first sync pattern has sub patterns assigned to the sync signals SY1-SY3 respectively and being exactly equal to the MSK mark detection patterns for the sync signals SY1-SY3 respectively. The second sync pattern allows temporal fluctuations (bit shifts) with respect to the first sync pattern or with respect to the MSK mark detection patterns for the sync signals SY1-SY3, and has sub patterns each assigned to one of the sync signals SY1-SY3 and hence being capable of identifying one of the sync signals SY1-SY3. The third sync pattern allows temporal fluctuations (bit shifts) with respect to the first sync pattern or with respect to the MSK mark detection patterns for the sync signals SY1-SY3, and has sub patterns each assigned to or corresponding to two or more of the sync signals SY1-SY3.

In FIG. 6, the first sync pattern has a sub pattern of "0-16-25", a sub pattern of "0-18-25", and a sub pattern of "0-20-25" which are assigned to the sync signals SY1, SY2, and SY3 respectively, and which are exactly equal to the MSK mark detection patterns for the sync signals SY1, SY2, and SY3 respectively.

The second sync pattern has a sub pattern of "0-15-25", a sub pattern of "0-16-24", a sub pattern of "0-16-26", a sub pattern of "0-17-26", and a sub pattern of "0-15-24" assigned to the sync signal SY1. The sub patterns assigned to the sync signal SY1 differ from the MSK mark detection pattern for the sync signal SY1, and hence allow temporal fluctuations (bit shifts) with respect to the MSK mark detection pattern for the sync signal SY1. The second sync pattern has a sub pattern of "0-17-24", a sub pattern of "0-18-24", a sub pattern of "0-18-26", and a sub pattern of "0-19-26" assigned to the sync signal SY2. The sub patterns assigned to the sync signal SY2 differ from the MSK mark detection pattern for the sync signal SY2, and hence allow temporal fluctuations (bit shifts) with respect to the MSK mark detection pattern for the sync signal SY2. The second sync pattern has a sub pattern of "0-19-24", a sub pattern of "0-20-24", a sub pattern of "0-20-26", a sub pattern of "0-21-25", and a sub pattern of "0-21-26" assigned to the sync signal SY3. The sub patterns assigned to the sync signal SY3 differ from the MSK mark detection pattern for the sync signal SY3, and hence allow temporal fluctuations (bit shifts) with respect to the MSK mark detection pattern for the sync signal SY3. Thus, each of the sub patterns in the second sync pattern is assigned to only one of the sync signals SY1-SY3. In other words, none of the sub patterns is assigned in common to two or more of the sync signals SY1-SY3. Accordingly, each of the sub patterns can identify corresponding one of the sync signals SY1-SY3.

The third sync pattern has a sub pattern of "0-17-25" assigned to the sync signal SY1. The sub pattern assigned to the sync signal SY1 differs from the MSK mark detection pattern for the sync signal SY1, and hence allows a temporal fluctuation (bit shift) with respect to the MSK mark detection pattern for the sync signal SY1. The third sync pattern has a sub pattern of "0-17-25" and a sub pattern of "0-19-25" assigned to the sync signal SY2. The sub patterns assigned to the sync signal SY2 differ from the MSK mark detection pattern for the sync signal SY2, and hence allows temporal fluctuations (bit shifts) with respect to the MSK mark detection pattern for the sync signal SY2. The third sync pattern has a sub pattern of "0-19-25" assigned to the sync signal SY3. The sub pattern assigned to the sync signal SY3 differs from the MSK mark detection pattern for the sync signal SY3, and hence allows a temporal fluctuation (bit shift) with respect to the MSK mark detection pattern for the sync signal SY3. Thus, a sub pattern of "0-17-25" is assigned in common to the sync signals SY1 and SY2. In addition, a sub pattern of "0-19-25" is assigned in common to the sync signals SY2 and SY3.

Figure 7:
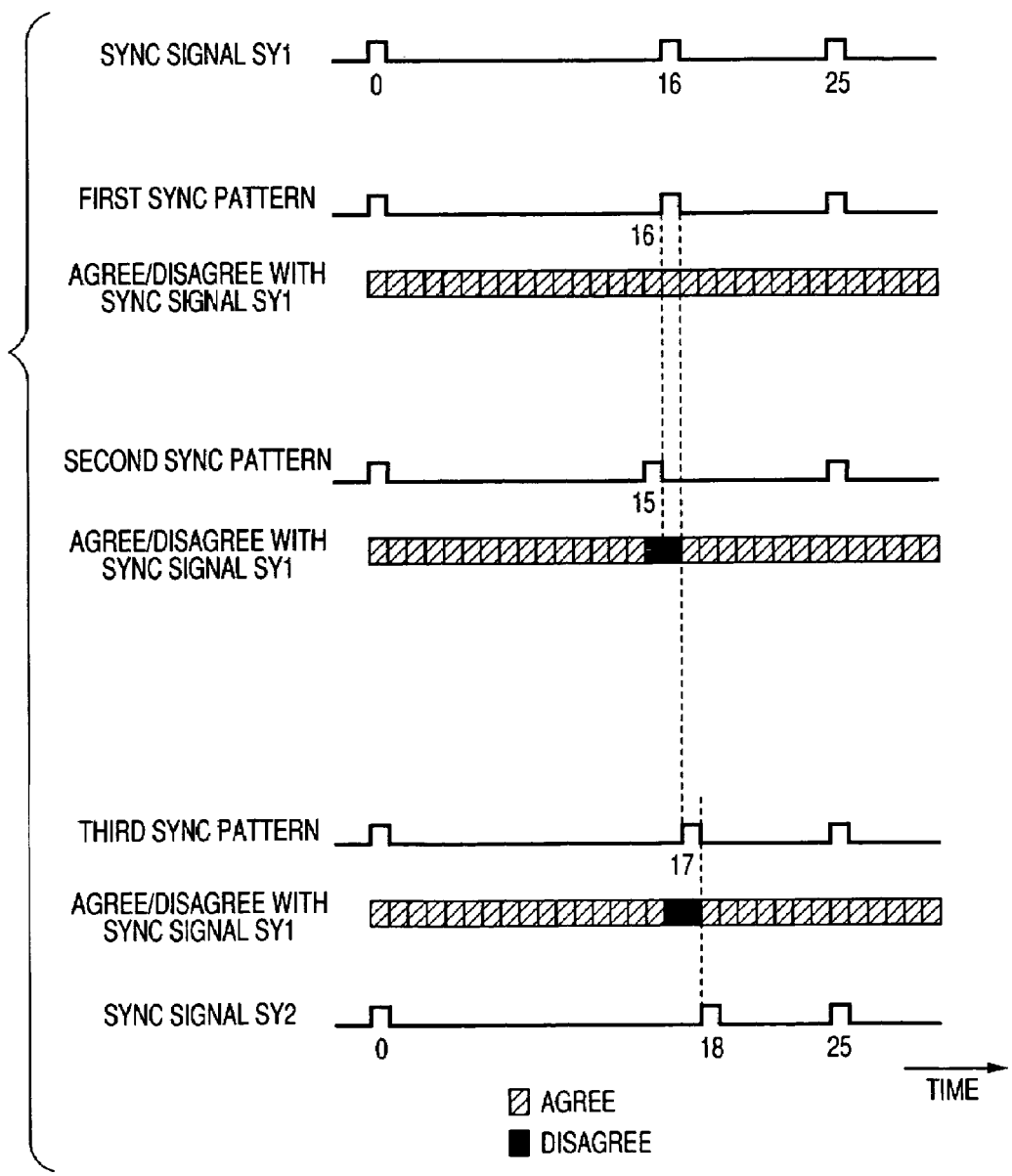
FIG. 7 is a time-domain diagram of the relation among sync signals SY1 and SY2, and the first, second, and third sync patterns in the first embodiment of this invention.

With reference to FIG. 7, an MSK mark detection pattern of "0-16-25" is correctly obtained for an incoming sync signal SY1. The obtained MSK mark detection pattern agrees with a sub pattern of "0-16-25" in the first sync pattern which is assigned to the sync signal SY1 in all bits. Accordingly, the obtained MSK mark detection pattern is recognized as an indication of the sync signal SY1.

The obtained MSK mark detection pattern "0-16-25" disagrees with a sub pattern of "0-15-25" in the second sync pattern which is assigned to the sync signal SY1 in only two bits at the 15th and 16th positions. There is only a 1-bit difference in position of the MSK mark m2 between the obtained MSK mark detection pattern "0-16-25" and a sub pattern of "0-15-25" in the second sync pattern which is assigned to the sync signal SY1. A sub pattern of "0-15-25" in the second sync pattern differs from a correct MSK mark detection pattern "0-18-25" for the sync signal SY2 in that a 3-bit difference in position of the MSK mark m2 is present between them. A sub pattern of "0-15-25" in the second sync pattern differs from a correct MSK mark detection pattern "0-20-25" for the sync signal SY3 in that a 5-bit difference in position of the MSK mark m2 is present between them. Accordingly, provided that predetermined conditions mentioned later are satisfied, a sub pattern of "0-15-25" in the second sync pattern is selected as one corresponding to a sync signal SY1 in which the MSK mark m2 shifts forward from the original position by a 1-bit distance.

The obtained MSK mark detection pattern "0-16-25" disagrees with a sub pattern of "0-17-25" in the third sync pattern which is assigned to the sync signals SY1 and SY2 in only two bits at the 16th and 17th positions. A correct MSK mark detection pattern "0-18-25" for the sync signal SY2 disagrees with a sub pattern of "0-17-25" in the third sync pattern in only two bits at the 17th and 18th positions. It is difficult to decide which of a sync signal SY1 where the MSK mark m2 shifts backward from the original position by a 1-bit distance and a sync signal SY2 where the MSK mark m2 shifts forward from the original position by a 1-bit distance a sub pattern of "0-17-25" in the third sync pattern corresponds to. Accordingly, provided that predetermined conditions mentioned later are satisfied, a sub pattern of "0-17-25" in the third sync pattern is regarded as one corresponding to either a sync signal SY1 or a sync signal SY2.

In operation of the optical-disc drive apparatus of FIG. 1, the optical pickup 2 applies the laser beam to the optical disc 1. The track on the optical disc 1 is scanned by the applied laser beam while the optical disc 1 is rotated. A portion of the applied laser beam returns to the optical pickup 2 after being reflected by the optical disc 1. The return laser beam contains the wobbling information recorded on the optical disc 1. The optical pickup 2 changes the return laser beam into the corresponding electric read signal through photoelectric conversion. The read signal is sent from the optical pickup 2 to the reproducing amplifier 3. The read signal is enlarged by the reproducing amplifier 3 before being fed to the equalizer 4.

The equalizer 4 subjects the read signal to the prescribed waveform equalization to suppress inter-symbol interference caused by a waveform distortion of the read signal. The equalizer 4 outputs the equalization-result signal to the waveform shaping circuit 5 and the synchronous detection circuit 7.

The waveform shaping circuit 5 converts the output signal of the equalizer 4 into the pulse signal reflecting the wobbling information. The waveform shaping circuit 5 outputs the pulse signal to the PLL 6. The PLL 6 generates the basic frequency signal (the basic clock signal) phase-locked with the pulse signal from the waveform shaping circuit 5. The generated basic frequency signal is synchronized with the wobble of the groove in the optical disc 1 which is scanned by the laser beam. The PLL 6 outputs the basic frequency signal (the basic clock signal) to the synchronous detection circuit 7 and the sync signal detection circuit 8.

At an initial stage, the synchronization state deciding section 20 in the sync signal detection circuit 8 initializes or resets the values of the synchronization-locked-state deciding counter (not shown) and the synchronization-unlocked-state deciding counter (not shown) to zero in response to the basic clock signal from the PLL 6.

The synchronous detection circuit 7 samples the wobbling information in the output signal of the equalizer 4 in response to the basic clock signal from the PLL 6 and thereby implements the synchronous detection to generate the synchronous-detection-result data containing the wobbling information and representing the wobble patterns and the MSK mark detection patterns for incoming sync signals. The synchronous detection circuit 7 outputs the synchronous-detection-result data to the first, second, and third sync pattern comparing sections 14, 15, and 16 in the sync signal detection circuit 8. In addition, the synchronous detection circuit 7 outputs the synchronous-detection-result data to the information detection circuit 9. Basically, the synchronous detection circuit 7 detects MSK marks in the output signal of the equalizer 4 through synchronous detection responsive to the basic clock signal, and generates a signal representative of MSK mark detection patterns formed by the detected MSK marks. The synchronous detection circuit 7 outputs the signal representative of the MSK mark detection patterns to the first, second, and third sync pattern comparing sections 14, 15, and 16 in the sync signal detection circuit 8.

The synchronous detection circuit 7 may be modified as follows. According to a first example of the modification, the synchronous detection circuit 7 samples the wobbling information in the output signal of the equalizer 4 in response to the basic clock signal from the PLL 6 and thereby implements the synchronous detection to generate the synchronous-detection-result data representing MSK mark detection patterns. According to a second example, the synchronous detection circuit 7 outputs MSK mark detection signals for incoming sync signals to the sync signal deciding section 17 in the sync signal detection circuit 8. In this case, the sync signal deciding section 17 outputs the MSK mark detection signals to the first, second, and third sync pattern comparing sections 14, 15, and 16, and instructs and controls each of them to perform the comparison.

In the sync signal detection circuit 8, the sync signal deciding section 17 determines whether or not the synchronization is in the unlocked state on the basis of the value of the synchronization-unlocked-state deciding counter in the synchronization state deciding section 20. In the case where the synchronization is in the unlocked state, the sync signal deciding section 17 further determines whether or not a sync signal has been detected.

The value of the synchronization-locked-state deciding counter is incremented and the value of the synchronization-unlocked-state deciding counter is reset to zero each time the pattern of a currently detected sync signal agrees with one of the sub patterns in the first, second, and third sync patterns. The value of the synchronization-unlocked-state deciding counter is incremented and the value of the synchronization-locked-state deciding counter is reset to zero each time the pattern of a currently detected sync signal agrees with none of the sub patterns in the first, second, and third sync patterns. When the value of the synchronization-locked-state deciding counter is equal to or greater than a prescribed value (for example, 2), it is determined that the synchronization is in the locked state. When the value of the synchronization-unlocked-state deciding counter is equal to or greater than a prescribed value (for example, 2), it is determined that the synchronization is in the unlocked state.

After the start of operation of the optical-disc drive apparatus, the synchronization is concluded to be continuously in the unlocked state until there occur a prescribed number of successively detected sync signals which have patterns equal to ones of the sub patterns in the first, second, and third sync patterns.

The above-mentioned determination as to whether or not a sync signal has been detected is implemented as follows. The sync signal deciding section 17 sets a flag representing the result of previous sync signal detection, and stores the flag in an internal cache memory (not shown) or a cache memory (not shown) within the synchronization state deciding section 20. The sync signal deciding section 17 carries out the determination as to whether or not a sync signal has been detected by referring to the state of the flag. In the case where the synchronization state deciding section 20 determines that the synchronization is in the unlocked state, for example, in the case where the synchronization-locked-state deciding counter is reset to zero, the sync signal deciding section 17 resets the flag. According to another example, when the value of the synchronization-locked-state deciding counter is zero, the sync signal deciding section 17 determines that a sync signal has not been detected. When the value of the synchronization-locked-state deciding counter differs from zero, the sync signal deciding section 17 determines that a sync signal has been detected.

In the case where the sync signal deciding section 17 determines that the synchronization is in the unlocked state and that a sync signal has not been detected, the sync signal deciding section 17 instructs and controls the first sync pattern comparing section 14 to implement the comparison between an MSK mark detection pattern of an incoming sync signal, which is outputted from the synchronous detection circuit 7, with the sub patterns in the first sync pattern fed from the first memory section 11. The sub patterns in the first sync pattern are "0-16-25", "0-18-25", and "0-20-25". The implementation of the comparison is at all possible timings in and out of sync signal detection timing windows (see FIG. 4) in view of the fact that the moment of the arrival of an incoming sync signal can not be expected in this case. When the result of the comparison indicates that the MSK mark detection pattern of the current sync signal agrees with none of the sub patterns in the first sync pattern, the sync signal deciding section 17 controls the synchronization state deciding section 20 to reset the value of the synchronization-locked-state deciding counter to zero and performs operation steps mentioned later. On the other hand, when the result of the comparison indicates that the MSK mark detection pattern of the current sync signal agrees with one of the sub patterns in the first sync pattern, the sync signal deciding section 17 determines that a sync signal is successfully detected. The sub pattern with which the MSK mark detection pattern of the current sync signal agrees is called the hit sub pattern. The sync signal deciding section 17 detects which of the sync signals SY-SY3 the hit sub pattern is assigned to. The sync signal deciding section 17 concludes that the successfully detected sync signal is one to which the hit sub pattern is assigned. The sync signal deciding section 17 sends this information to the next sync signal estimating section 19. Then, the sync signal deciding section 17 notifies the successful detection of a sync signal to the synchronization state deciding section 20 and the timing signal generating section 18. In response to the notified successful detection of a sync signal, the synchronization state deciding section 20 increments the value of the synchronization-locked-state deciding counter and resets the value of the synchronization-unlocked-state deciding counter to zero.

Thereafter, the sync signal deciding section 17 loads the internal cache memory or another memory with a sync signal estimated to be detected next to the current sync signal. The estimated next sync signal is notified by the next sync signal estimating section 19. In the case where the current sync signal is the sync signal SY1, the sync signal SY2 is used as the sync signal estimated to be detected next to the current sync signal. In the case where the current sync signal is the sync signal SY2, the sync signal SY3 is used as the sync signal estimated to be detected next to the current sync signal. In the case where the current sync signal is the sync signal SY3, the sync signal SY1 is used as the sync signal estimated to be detected next to the current sync signal.

Subsequently, the synchronization state deciding section 20 refers to the value of the synchronization-locked-state deciding counter and thereby determines whether or not a prescribed number of successive sync signals are successfully detected, that is, whether or not there occur a prescribed number of successively detected sync signals which have patterns equal to ones of the sub patterns in the first, second, and third sync patterns. When it is determined that the prescribed number of successive sync signals are not successfully detected, the sync signal deciding section 17 and the synchronization state deciding section 20 repeat the above-mentioned operation steps for a next sync signal. Accordingly, the above-mentioned operation steps are performed for each of sync signals in an order like SY1, SY2, SY3, SY1, SY2, . . . . In the case of the first detected sync signal SY1 occurring after the start of operation of the optical-disc drive apparatus, it is surely determined that the prescribed number of successive sync signals are not successfully detected.

On the other hand, when it is determined that the prescribed number of successive sync signals are successfully detected, the synchronization state deciding section 20 decides that the synchronization is in the locked state. Then, the synchronization state deciding section 20 notifies the contents of the decision, that is, the synchronization-locked-state decision information, to the timing signal generating section 18.

Then, the timing signal generating section 18 produces a timing signal or signals for the reading of post-sync data DT in response to the synchronization-locked-state decision information fed from the synchronization state deciding section 20 and the successful sync signal detection notified by the sync signal deciding section 17. The timing signal generating section 18 outputs the produced timing signal or signals to the information detection circuit 9. Thereafter, the sync signal deciding section 17 and the synchronization state deciding section 20 repeat the above-mentioned operation steps for a next sync signal.

Figure 8:
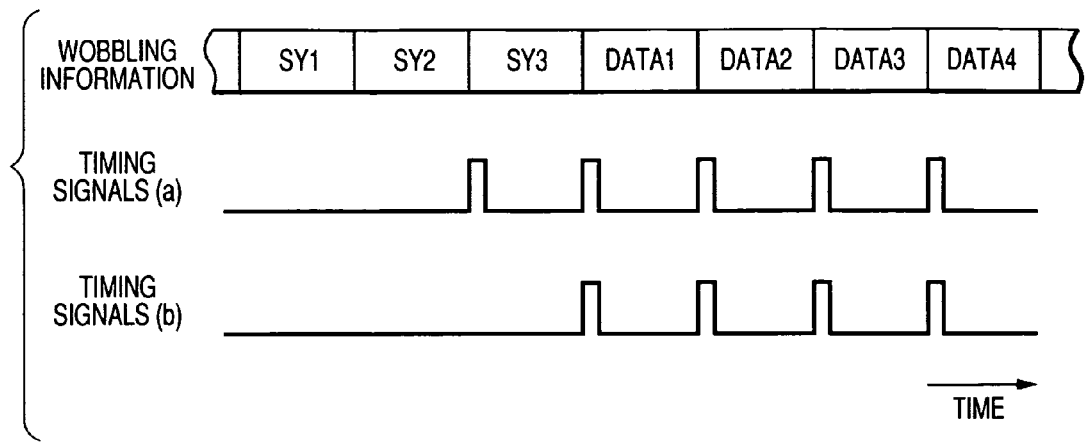
FIG. 8 is a time-domain diagram of detected wobbling information and timing signals in the first embodiment of this invention.

With reference to FIG. 8, post-sync data DT follows a set of sync signals SY1-SY3, and has a sequence of data pieces DATA1, DATA2, DATA3, . . . . In the case where the sync signal deciding section 17 decides the successful detection of a sync signal SY2 and the synchronization state deciding section 20 makes the synchronization-locked-state decision for the detected sync signal SY2, the timing signal generating section 18 produces and outputs timing signals (a) at moments as shown in FIG. 8. In the case where the sync signal deciding section 17 decides the successful detection of a sync signal SY3 and the synchronization state deciding section 20 makes the synchronization-locked-state decision for the detected sync signal SY3, the timing signal generating section 18 produces and outputs timing signals (b) at moments as shown in FIG. 8.

In the case where the sync signal deciding section 17 determines that the synchronization is not in the unlocked state, or in the case where the sync signal deciding section 17 determines that the synchronization is in the unlocked state and that a sync signal has been detected, the sync signal deciding section 17 instructs and controls the first sync pattern comparing section 14 to implement the comparison between an MSK mark detection pattern of an incoming sync signal, which is outputted from the synchronous detection circuit 7, with the sub patterns in the first sync pattern fed from the first memory section 11 only during a related sync signal detection timing window (see FIG. 4). The use of the sync signal detection timing window prevents false sync signals located at time positions outside true sync signal time positions from being detected and recognized as true ones. Therefore, it is possible to enhance the accuracy of the detection of a sync signal. Alternatively, the implementation of the comparison may be at all possible timings in and out of sync signal detection timing windows (see FIG. 4). When the result of the comparison indicates that the MSK mark detection pattern of the current sync signal agrees with one of the sub patterns in the first sync pattern, the sync signal deciding section 17 determines that a sync signal is successfully detected. The sub pattern with which the MSK mark detection pattern of the current sync signal agrees is called the hit sub pattern. Then, the sync signal deciding section 17 and the synchronization state deciding section 20 operate as in the previously-mentioned case.

On the other hand, when the result of the comparison indicates that the MSK mark detection pattern of the current sync signal agrees with none of the sub patterns in the first sync pattern, the sync signal deciding section 17 instructs and controls the second sync pattern comparing section 15 to implement the comparison between the MSK mark detection pattern of the current sync signal with the sub patterns in the second sync pattern fed from the second memory section 12. In the case where the result of the comparison indicates that the MSK mark detection pattern of the current sync signal agrees with one of the sub patterns in the second sync pattern, the sync signal deciding section 17 accesses the second sync pattern comparing section 15 and determines whether or not the hit sub pattern in the second sync pattern is one assigned to a sync signal estimated to be detected next to the previously detected sync signal. Specifically, for the previously detected sync signal being one denoted by SY2, the sync signal deciding section 17 determines whether or not the hit sub pattern in the second sync pattern is one assigned to the sync signal SY3. For the previously detected sync signal being one denoted by SY3, the sync signal deciding section 17 determines whether or not the hit sub pattern in the second sync pattern is one assigned to the sync signal SY1. For the previously detected sync signal being one denoted by SY1, the sync signal deciding section 17 determines whether or not the hit sub pattern in the second sync pattern is one assigned to the sync signal SY2. When the hit sub pattern in the second sync pattern is one assigned to a sync signal estimated to be detected next to the previously detected sync signal, the sync signal deciding section 17 determines that a sync signal is successfully detected. Then, the sync signal deciding section 17 and the synchronization state deciding section 20 operate as in the previously-mentioned case.

On the other hand, when the hit sub pattern in the second sync pattern differs from one assigned to a sync signal estimated to be detected next to the previously detected sync signal, the sync signal deciding section 17 determines that a sync signal is not successfully detected. Then, the sync signal deciding section 17 controls the synchronization state counter 20 to increment the value of the synchronization-unlocked-state deciding counter. Subsequently, the synchronization state deciding section 20 refers to the value of the synchronization-unlocked-state deciding counter and thereby determines whether or not a prescribed number of successive sync signals fail to be successfully detected. Only when it is determined that the prescribed number of successive sync signals fail to be successfully detected, the synchronization state deciding section 20 decides that the synchronization is in the unlocked state. Thereafter, the sync signal deciding section 17 and the synchronization state deciding section 20 repeat the above-mentioned operation steps for a next sync signal. It should be noted that the synchronization state deciding section 20 may determine whether or not at least one sync signal fails to be successfully detected. In this case, only when it is determined that at least one sync signal fails to be successfully detected, the synchronization state deciding section 20 decides that the synchronization is in the unlocked state.

In the case where the result of the comparison by the second sync pattern comparing section 15 indicates that the MSK mark detection pattern of the current sync signal agrees with none of the sub patterns in the second sync pattern, the synchronization state deciding section 20 determines whether or not the synchronization is in the locked state. When it is determined that the synchronization is not in the locked state, the sync signal deciding section 17 controls the synchronization state deciding section 20 to reset the value of the synchronization-locked-state deciding counter to zero. Then, the sync signal deciding section 17 determines that a sync signal is not successfully detected. Thereafter, the sync signal deciding section 17 and the synchronization state deciding section 20 operate as in the previously-mentioned case. On the other hand, when it is determined that the synchronization is in the locked state, the sync signal deciding section 17 instructs and controls the third sync pattern comparing section 16 to implement the comparison between the MSK mark detection pattern of the current sync signal with the sub patterns in the third sync pattern fed from the third memory section 13. In the case where the result of the comparison indicates that the MSK mark detection pattern of the current sync signal agrees with none of the sub patterns in the third sync pattern, the sync signal deciding section 17 controls the synchronization state deciding section 20 to reset the value of the synchronization-locked-state deciding counter to zero. Then, the sync signal deciding section 17 determines that a sync signal is not successfully detected. Thereafter, the sync signal deciding section 17 and the synchronization state deciding section 20 operate as in the previously-mentioned case.

On the other hand, in the case where the result of the comparison by the third sync pattern comparing section 16 indicates that the MSK mark detection pattern of the current sync signal agrees with one of the sub patterns in the third sync pattern, the sync signal deciding section 17 accesses the third sync pattern comparing section 16 and determines whether or not the hit sub pattern in the third sync pattern is one assigned to a sync signal estimated to be detected next to the previously detected sync signal. Specifically, for the previously detected sync signal being one denoted by SY2, the sync signal deciding section 17 determines whether or not the hit sub pattern in the third sync pattern is one assigned to the sync signal SY3. For the previously detected sync signal being one denoted by SY3, the sync signal deciding section 17 determines whether or not the hit sub pattern in the third sync pattern is one assigned to the sync signal SY1. For the previously detected sync signal being one denoted by SY1, the sync signal deciding section 17 determines whether or not the hit sub pattern in the third sync pattern is one assigned to the sync signal SY2. When the hit sub pattern in the third sync pattern is one assigned to a sync signal estimated to be detected next to the previously detected sync signal, the sync signal deciding section 17 determines that a sync signal is successfully detected. Then, the sync signal deciding section 17 and the synchronization state deciding section 20 operate as in the previously-mentioned case. On the other hand, when the hit sub pattern in the third sync pattern differs from one assigned to a sync signal estimated to be detected next to the previously detected sync signal, the sync signal deciding section 17 determines that a sync signal is not successfully detected. Then, the sync signal deciding section 17 and the synchronization state counter 20 operate as in the previously-mentioned case regarding the comparison with the second sync pattern.

Figure 9:
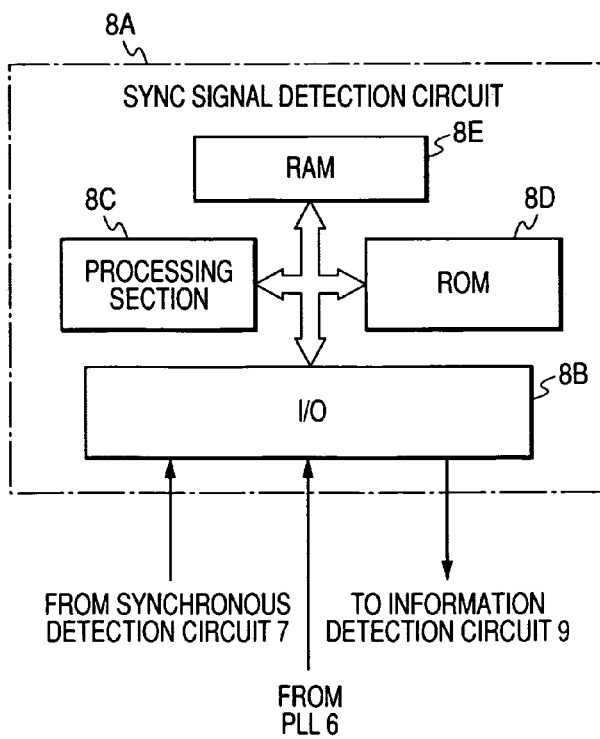
FIG. 9 is a block diagram of a sync signal detection circuit including a computer-based programmable device in the first embodiment of this invention.

FIG. 9 shows a sync signal detection circuit 8A which may replace the sync signal detection circuit 8 in FIG. 1. The sync signal detection circuit 8A includes a computer-based programmable device having a combination of an input/output port 8B, a processing section 8C, a ROM 8D, and a RAM 8E. Examples of the computer-based programmable device are a digital signal processor, a microcomputer, and a CPU. The sync signal detection circuit 8A operates in accordance with a control program (a computer program) stored in the ROM. The synchronization-locked-state deciding counter and the synchronization-unlocked-state deciding counter are provided in the RAM. The first, second, and third sync patterns are stored in the ROM.

The sync signal detection circuit 8A may further include a combination of a hard disk and a hard-disk drive which is connected with the processing section 8C. In this case, it is preferable that the control program and the first, second, and third sync patterns are stored in the hard disk rather than the ROM.

Figure 10:
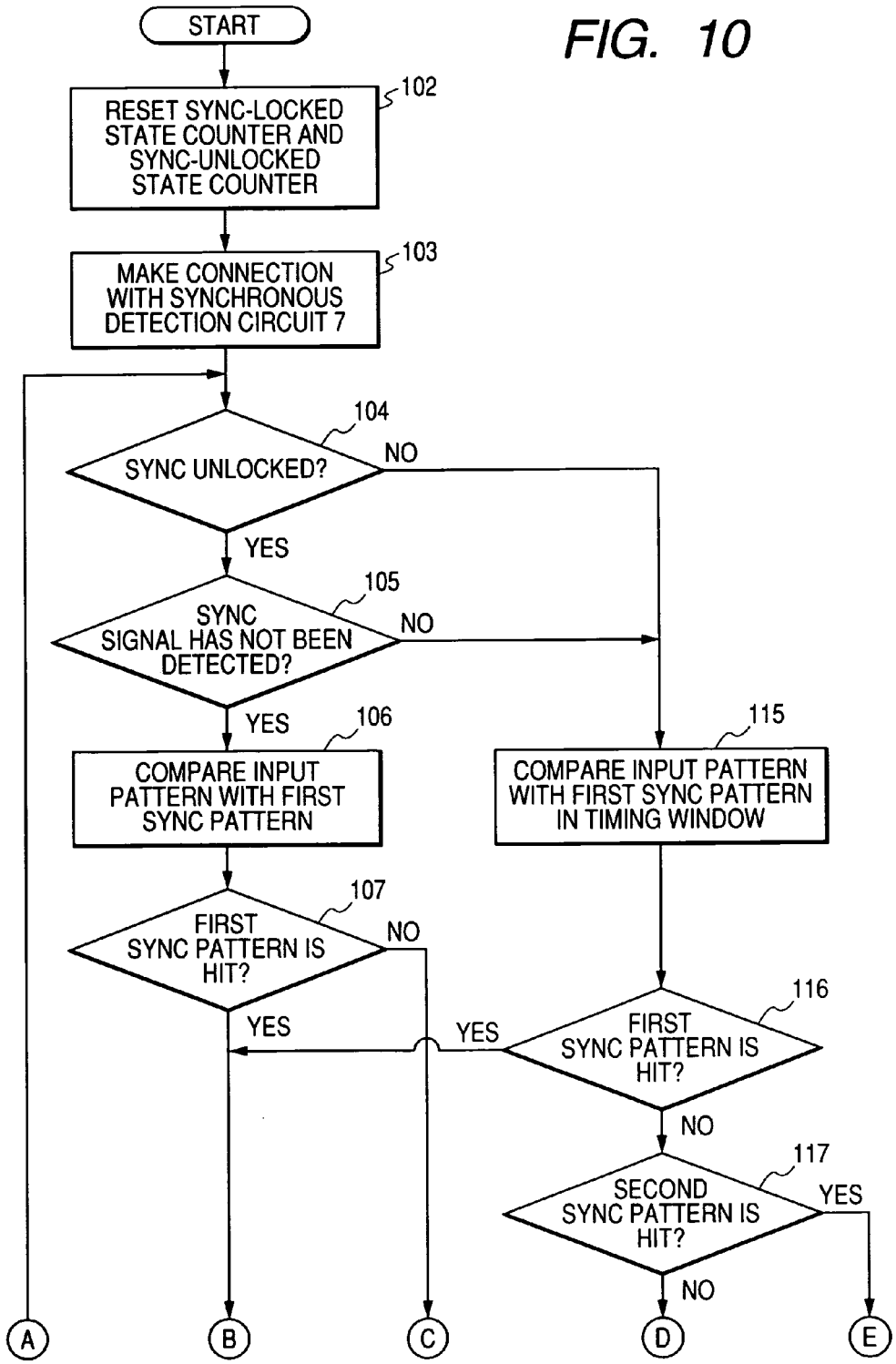
FIGS. 10 and 11 are a flowchart of a control program for the sync signal detection circuit in FIG. 9.
Figure 11:
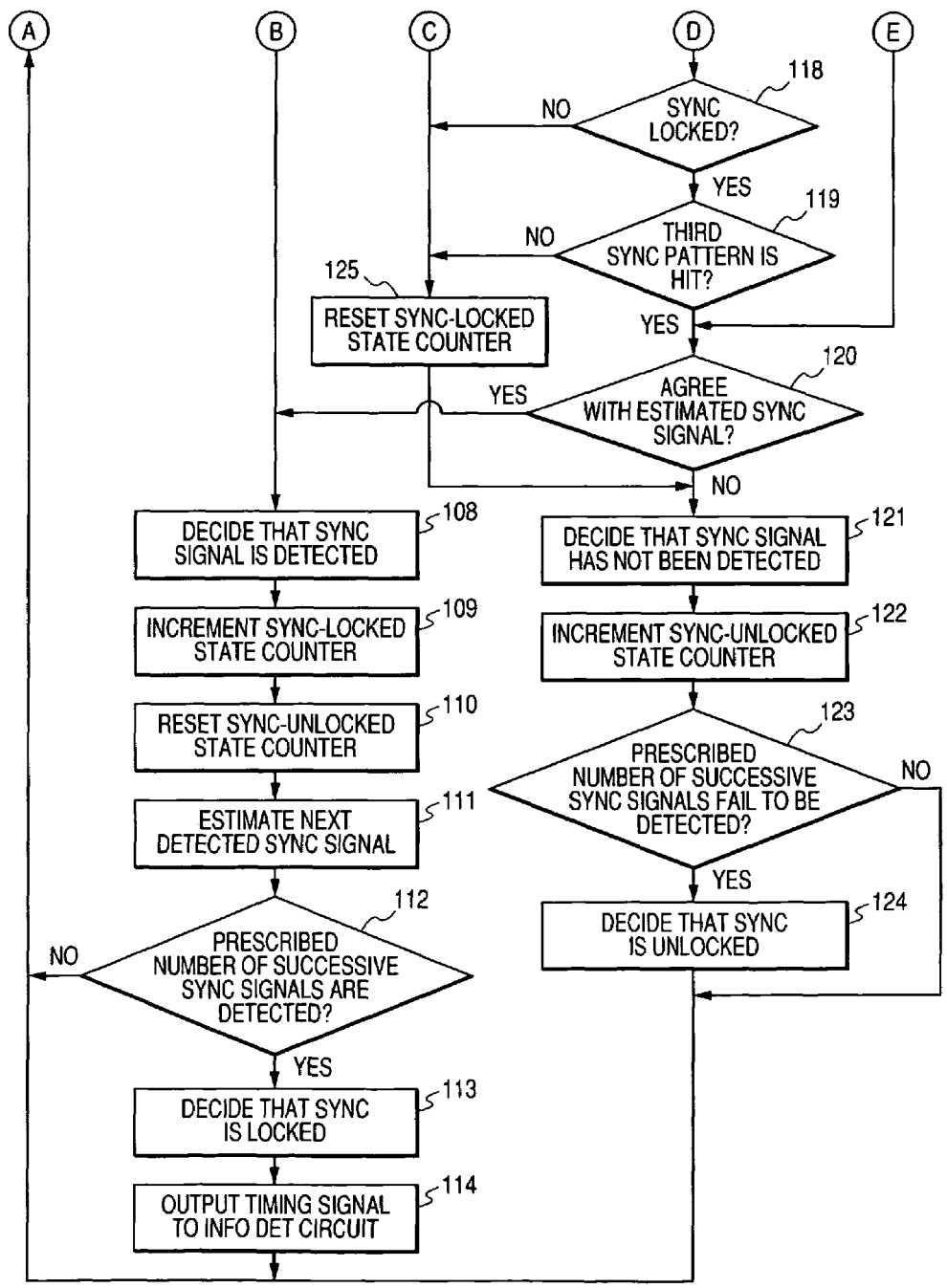

FIGS. 10 and 11 are a flowchart of the control program for the sync signal detection circuit 8A. With reference to FIGS. 10 and 11, a first step 102 of the program initializes or resets the values of the synchronization-locked-state deciding counter and the synchronization-unlocked-state deciding counter to zero in response to the basic clock signal from the PLL 6.

A step 103 following the step 102 makes connection with the synchronous detection circuit 7 to receive the output signal thereof which represents an MSK mark detection pattern of a repetitively-occurring input sync signal. After the step 103, the program advances to a step 104.

The step 104 determines whether or not the synchronization is in the unlocked state on the basis of the value of the synchronization-unlocked-state deciding counter. When the synchronization is not in the unlocked state, the program advances from the step 104 to a step 115. On the other hand, when the synchronization is in the unlocked state, the program advances from the step 104 to a step 105.

The step 105 determines whether or not a sync signal has been detected. When a sync signal has been detected, the program advances from the step 105 to the step 115. On the other hand, when a sync signal has not been detected, the program advances from the step 105 to a step 106.

The step 106 compares an MSK mark detection pattern of an incoming sync signal, which is represented by the output signal of the synchronous detection circuit 7, with the sub patterns in the first sync pattern at all possible timings in and out of sync signal detection timing windows (see FIG. 4).

A step 107 following the step 106 refers to the result of the comparison by the step 106, and determines whether or not the MSK mark detection pattern in question agrees with one of the sub patterns in the first sync pattern. When the MSK mark detection pattern in question agrees with one of the sub patterns in the first sync pattern, the program advances from the step 107 to a step 108. The sub pattern with which the MSK mark detection pattern in question agrees is called the hit sub pattern. On the other hand, when the MSK mark detection pattern in question agrees with none of the sub patterns in the first sync pattern, the program advances from the step 107 to a step 125.

The step 125 resets the value of the synchronization-locked-state deciding counter to zero. After the step 125, the program advances to a step 121.

The step 108 determines that a sync signal is successfully detected.

A step 109 following the step 108 increments the value of the synchronization-locked-state deciding counter.

A step 110 subsequent to the step 109 resets the value of the synchronization-unlocked-state deciding counter to zero.

A step 111 following the step 110 determines which of the sync signals SY1, SY2, and SY3 the current sync signal recognized by the step 108 corresponds to by referring to the hit sub pattern detected in the step 107, a step 116, or a step 119. The steps 116 and 119 will be explained later. Then, the step 111 sets a sync signal estimated to be detected next to the current sync signal. In the case where the current sync signal corresponds to the sync signal SY1, the sync signal SY2 is selected as the sync signal estimated to be detected next to the current sync signal. In the case where the current sync signal corresponds to the sync signal SY2, the sync signal SY3 is selected as the sync signal estimated to be detected next to the current sync signal. In the case where the current sync signal corresponds to the sync signal SY3, the sync signal SY1 is selected as the sync signal estimated to be detected next to the current sync signal.

A step 112 subsequent to the step 111 refers to the value of the synchronization-locked-state deciding counter and thereby determines whether or not a prescribed number of successive sync signals are successfully detected, that is, whether or not there occur a prescribed number of successively detected sync signals which have patterns equal to ones of the sub patterns in the first, second, and third sync patterns. When it is determined that the prescribed number of successive sync signals are successfully detected, the program advances from the step 112 to a step 113. Otherwise, the program returns from the step 112 to the step 104. In this case, the step 104 and the later steps are executed for a next incoming sync signal.

The step 113 decides that the synchronization is in the locked state.

A step 114 following the step 113 outputs a timing signal or signals for the reading of post-sync data DT to the information detection circuit 9 in response to the basic clock signal from the PLL 6. After the step 114, the program returns to the step 104. In this case, the step 104 and the later steps are executed for a next incoming sync signal.

The step 115 compares an MSK mark detection pattern of an incoming sync signal, which is represented by the output signal of the synchronous detection circuit 7, with the sub patterns in the first sync pattern only during a related sync signal detection timing window (see FIG. 4).

A step 116 subsequent to the step 115 refers to the result of the comparison by the step 115, and determines whether or not the MSK mark detection pattern in question agrees with one of the sub patterns in the first sync pattern. When the MSK mark detection pattern in question agrees with one of the sub patterns in the first sync pattern, the program advances from the step 116 to the step 108. The sub pattern with which the MSK mark detection pattern in question agrees is called the hit sub pattern. On the other hand, when the MSK mark detection pattern in question agrees with none of the sub patterns in the first sync pattern, the program advances from the step 116 to a step 117.

The step 117 compares the MSK mark detection pattern in question with the sub patterns in the second sync pattern. When the result of the comparison indicates that the MSK mark detection pattern in question agrees with one of the sub patterns in the second sync pattern, the program advances from the step 117 to a step 120. The sub pattern with which the MSK mark detection pattern in question agrees is called the hit sub pattern. On the other hand, when the result of the comparison indicates that the MSK mark detection pattern in question agrees with none of the sub patterns in the second sync pattern, the program advances from the step 117 to a step 118.

The step 120 determines whether or not the hit sub pattern (in the second sync pattern or the third sync pattern) is one assigned to a sync signal estimated to be detected next to the previously detected sync signal. Specifically, for the previously detected sync signal being one denoted by SY2, the step 120 determines whether or not the hit sub pattern is one assigned to the sync signal SY3. For the previously detected sync signal being one denoted by SY3, the step 120 determines whether or not the hit sub pattern is one assigned to the sync signal SY1. For the previously detected sync signal being one denoted by SY1, the step 120 determines whether or not the hit sub pattern is one assigned to the sync signal SY2. When the hit sub pattern is one assigned to a sync signal estimated to be detected next to the previously detected sync signal, the program advances from the step 120 to the step 108. Otherwise, the program advances from the step 120 to a step 121.

The step 121 determines that a sync signal is not successfully detected.

A step 122 following the step 121 increments the value of the synchronization-unlocked-state deciding counter.

A step 123 subsequent to the step 122 refers to the value of the synchronization-unlocked-state deciding counter and thereby determines whether or not a prescribed number of successive sync signals fail to be successfully detected. When a prescribed number of successive sync signals fail to be successfully detected, the program advances from the step 123 to a step 124. Otherwise, the program returns from the step 123 to the step 104. In this case, the step 104 and the later steps are executed for a next incoming sync signal.

The step 124 decides that the synchronization is in the unlocked state. After the step 124, the program returns to the step 104. In this case, the step 104 and the later steps are executed for a next incoming sync signal.

The step 118 determines whether or not the synchronization is in the locked state on the basis of the value of the synchronization-locked-state deciding counter. When the synchronization is in the locked state, the program advances from the step 118 to a step 119. Otherwise, the program advances from the step 118 to the step 125.

The step 119 compares the MSK mark detection pattern in question with the sub patterns in the third sync pattern. When the result of the comparison indicates that the MSK mark detection pattern in question agrees with one of the sub patterns in the third sync pattern, the program advances from the step 119 to the step 120. The sub pattern with which the MSK mark detection pattern in question agrees is called the hit sub pattern. On the other hand, when the result of the comparison indicates that the MSK mark detection pattern in question agrees with none of the sub patterns in the third sync pattern, the program advances from the step 119 to the step 125.

Figure 12:
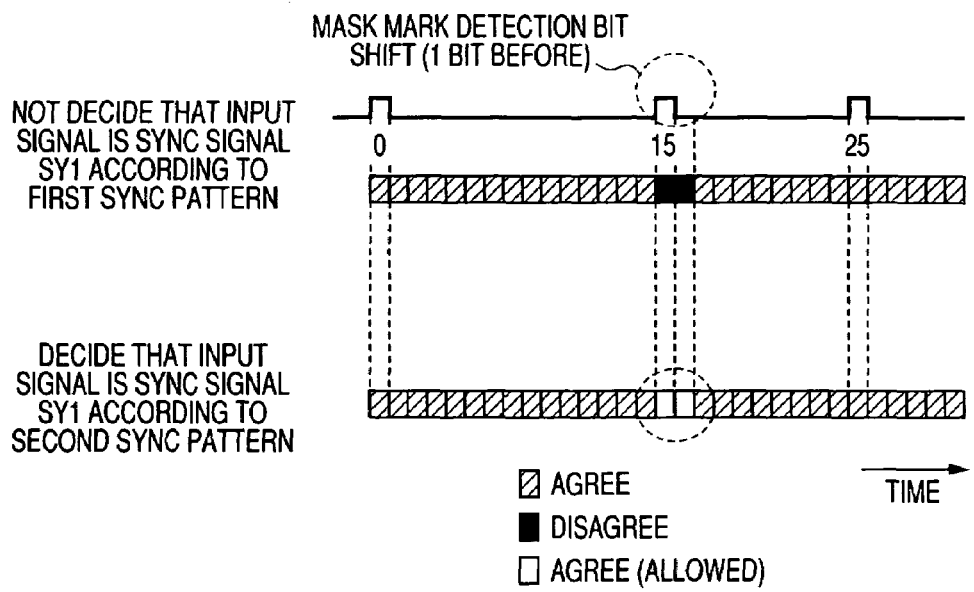
FIG. 12 is a time-domain diagram of an MSK mark detection pattern and the first and second sync patterns in the first embodiment of this invention.

With reference to FIG. 12, there is an MSK mark detection pattern "0-15-25" of a sync signal which is represented by the output signal of the synchronous detection circuit 7. For example, the MSK mark detection pattern "0-15-25" originates from the sync signal SY1 corresponding to an MSK mark detection pattern of "0-16-25" under poor wobbling-information detecting conditions where the MSK mark m2 in the sync signal SY1 is detected at the 15th bit position which precedes the original bit position (the 16th bit position) by one bit. The MSK mark detection pattern "0-15-25" means that the MSK marks m1, m2, and m3 are detected at the 0th, 15th, and 25th bit positions respectively.

A description will be given of the case where the MSK mark detection pattern "0-15-25" is compared with a sub pattern of "0-16-25" in the first sync pattern which is assigned to the sync signal SY1. In this case, the MSK mark detection pattern "0-15-25" and the sub pattern "0-16-25" disagree with each other in logic states taken at the 15th and 16th bit positions. Therefore, it is not determined that a sync signal SY1 is detected. This case corresponds to one of the following operation procedures A1 and A2 in FIGS. 10 and 11. A1: The step 104 determines that the synchronization is in the unlocked state, and then the step 105 determines that a sync signal has not been detected. Thereafter, the step 107 determines that the MSK mark detection pattern in question agrees with none of the sub patterns in the first sync pattern. A2: The step 104 determines that the synchronization is not in the unlocked state, or the step 105 determines that a sync signal has been detected. Then, the step 116 determines that the MSK mark detection pattern in question agrees with none of the sub patterns in the first sync pattern.

A description will be given of the case where the MSK mark detection pattern "0-15-25" is compared with a sub pattern of "0-15-25" in the second sync pattern which is assigned to the sync signal SY1. In this case, the MSK mark detection pattern "0-15-25" and the sub pattern "0-15-25" completely agree with each other. Therefore, it is determined that a sync signal SY1 is detected. This case corresponds to the following operation procedure B1 in FIGS. 10 and 11. B1: The step 116 determines that the MSK mark detection pattern in question agrees with none of the sub patterns in the first sync pattern, and then the step 117 determines that the MSK mark detection pattern in question agrees with one of the sub patterns in the second sync pattern. Thereafter, the step 120 determines that the hit sub pattern in the second sync pattern is one assigned to a sync signal estimated to be detected next to the previously detected sync signal.

Figure 13:
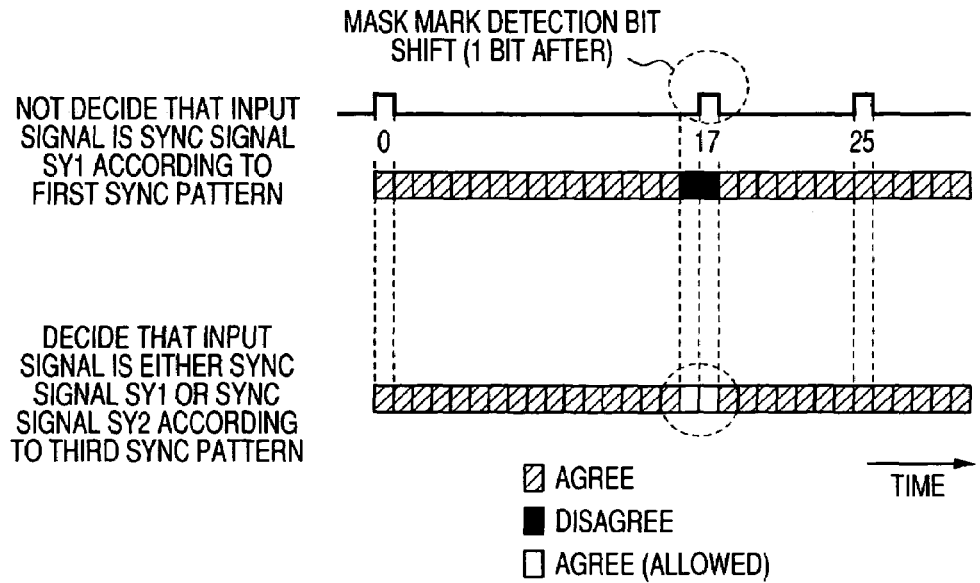
FIG. 13 is a time-domain diagram of an MSK mark detection pattern and the first and third sync patterns in the first embodiment of this invention.

With reference to FIG. 13, there is an MSK mark detection pattern "0-17-25" of a sync signal which is represented by the output signal of the synchronous detection circuit 7. For example, the MSK mark detection pattern "0-17-25" originates from the sync signal SY1 corresponding to an MSK mark detection pattern of "0-16-25" under poor wobbling-information detecting conditions where the MSK mark m2 in the sync signal SY1 is detected at the 17th bit position which follows the original bit position (the 16th bit position) by one bit. According to another example, the MSK mark detection pattern "0-17-25" originates from the sync signal SY2 corresponding to an MSK mark detection pattern of "0-18-25" under poor wobbling-information detecting conditions where the MSK mark m2 in the sync signal SY2 is detected at the 17th bit position which precedes the original bit position (the 16th bit position) by one bit. The MSK mark detection pattern "0-17-25" means that the MSK marks m1, m2, and m3 are detected at the 0th, 17th, and 25th bit positions respectively.

A description will be given of the case where the MSK mark detection pattern "0-17-25" is compared with a sub pattern of "0-16-25" in the first sync pattern which is assigned to the sync signal SY1. In this case, the MSK mark detection pattern "0-17-25" and the sub pattern "0-16-25" disagree with each other in logic states taken at the 16th and 17th bit positions. Therefore, it is not determined that a sync signal SY1 is detected. This case corresponds to one of the previously-mentioned operation procedures A1 and A2 in FIGS. 10 and 11.

A description will be given of the case where the MSK mark detection pattern "0-17-25" is compared with a sub pattern of "0-17-25" in the third sync pattern which is assigned in common to the sync signals SY1 and SY2. In this case, the MSK mark detection pattern "0-17-25" and the sub pattern "0-17-25" completely agree with each other. Under conditions where the synchronization continues to be in the locked state and a sync signal estimated to be detected next is one denoted by SY1, it is determined that a sync signal SY1 is detected. On the other hand, under conditions where the synchronization continues to be in the locked state and a sync signal estimated to be detected next is one denoted by SY2, it is determined that a sync signal SY2 is detected. This case corresponds to the following operation procedure C1 in FIGS. 10 and 11. C1: The step 104 determines that the synchronization is not in the unlocked state, or the step 105 determines that a sync signal has been detected. Thereafter, the step 116 determines that the MSK mark detection pattern in question agrees with none of the sub patterns in the first sync pattern, and then the step 117 determines that the MSK mark detection pattern in question agrees with none of the sub patterns in the second sync pattern. Subsequently, the step 119 determines that the MSK mark detection pattern in question agrees with none of the sub patterns in the third sync pattern. Then, the step 120 determines that the hit sub pattern in the third sync pattern is one assigned to a sync signal estimated to be detected next to the previously detected sync signal.

The sync signal detection circuit 8 or 8A provides advantages as follows. The sub patterns in the first sync pattern are exactly equal to the MSK mark detection patterns of the plural different sync signals, respectively. There are the second and third sync patterns in addition to the first sync pattern. The sub patterns in the second and third sync patterns are designed to allow temporal fluctuations (bit shifts) with respect to the MSK mark detection patterns of the plural different sync signals. Such temporal fluctuations (bit shifts) are caused by, for example, poor wobbling-information detecting conditions. The MSK mark detection pattern of every incoming sync signal is collated with the sub patterns in the first, second, and third sync patterns. The result of the collation is used for determining whether or not a sync signal is successfully detected, determining whether the synchronization is in the locked state or the unlocked state, and estimating a sync signal to be detected next to the currently detected sync signal. Even when the MSK mark detection pattern of an incoming sync signal has an allowable temporal fluctuation (bit shift), the incoming sync signal can be recognized as a true sync signal. Accordingly, incoming sync signals with allowable temporal fluctuations (bit shifts) are prevented from being overlooked. Thus, it is possible to enhance the accuracy and reliability of the generation of a timing signal in response to the detection of incoming sync signals.

The accuracy of the synchronous detection by the synchronous detection circuit 7 is decreased by factors such as cross talk between wobbles of adjacent track portions in the optical disc 1, and degradation of the optical disc 1. The decrease in the accuracy of the synchronous detection causes temporal fluctuations (bit shifts) in the MSK mark detection patterns of incoming sync signals. In addition, there occur distortion of reproduced wobbling information and false inversion of the phase of the reproduced wobbling information. Even under such poor conditions, it is possible to accurately determine whether the synchronization is in the locked state or the unlocked state. Furthermore, it is possible to accurately and stably demodulate the wobbling information to recover the contents thereof.

Second Embodiment

A second embodiment of this invention is similar to the first embodiment thereof except for design changes described hereafter.

Figure 14:
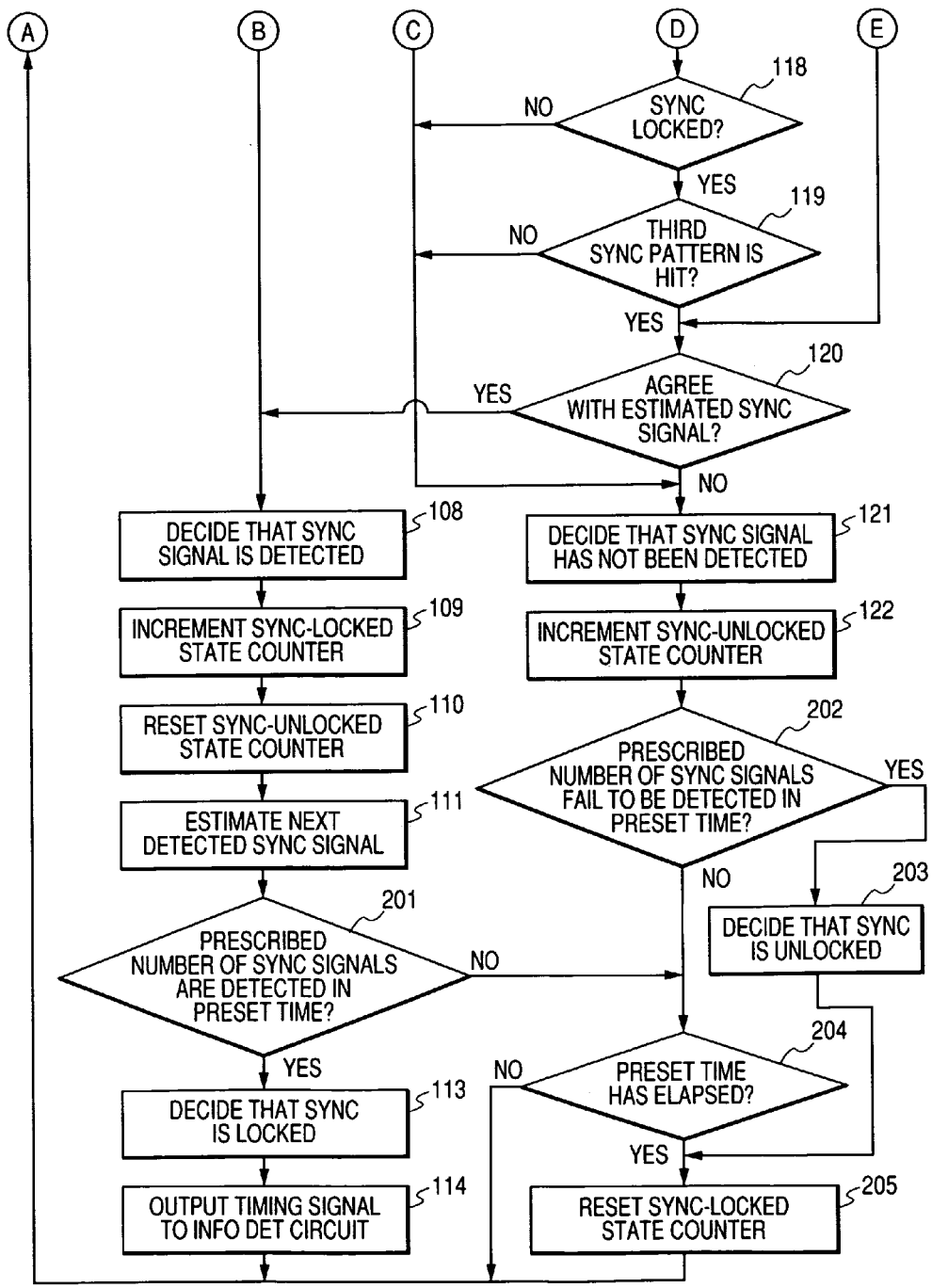
FIG. 14 is a flowchart of a portion of a control program for the computer-based sync signal detection circuit in a second embodiment of this invention.

FIG. 14 is a portion of a flowchart of a control program for the sync signal detection circuit 8A (see FIG. 9) in the second embodiment of this invention. The portion of the flowchart in FIG. 14 replaces the portion of the flowchart in FIG. 11.

The portion of the flowchart in FIG. 14 has a step 201 instead of the step 112 (see FIG. 11). The step 201 refers to the value of the synchronization-locked-state deciding counter and thereby determines whether or not at least a prescribed number of sync signals are successfully detected in a preset time, that is, whether or not there occur at least a prescribed number of detected sync signals which have patterns equal to ones of the sub patterns in the first, second, and third sync patterns in the preset time. When it is determined that at least the prescribed number of sync signals are successfully detected in the preset time, the program advances from the step 201 to the step 113. Otherwise, the program advances from the step 201 to a step 204.

The step 125 (see FIG. 11) is omitted from the portion of the flowchart in FIG. 14. Thus, the step 121 is directly connected with the step 107 (see FIG. 10) and with the steps 118 and 119.

The portion of the flowchart in FIG. 14 has a step 202 instead of the step 123 (see FIG. 11). The step 202 refers to the value of the synchronization-unlocked-state deciding counter and thereby determines whether or not at least a prescribed number of sync signals fail to be successfully detected in the preset time. When it is determined that at least the prescribed number of sync signals fail to be successfully detected in the preset time, the program advances from the step 202 to a step 203. Otherwise, the program advances from the step 202 to the step 204.

The step 203 decides that the synchronization is in the unlocked state. After the step 203, the program advances to a step 205.

The step 204 determines whether or not the preset time has elapsed. When the preset time has elapsed, the program advances from the step 204 to the step 205. Otherwise, the program returns from the step 204 to the step 104 (see FIG. 10).

The step 205 resets the value of the synchronization-locked-state deciding counter to zero. After the step 205, the program returns to the step 104 (see FIG. 10).

Figure 15:
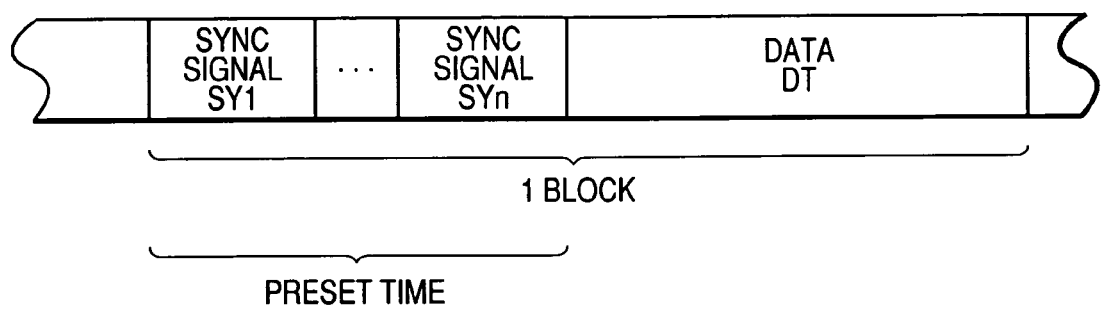
FIG. 15 is a diagram of the relation between wobbling information and a preset time in the second embodiment of this invention.

With reference to FIG. 15, every block of the wobbling information has a plurality of sync signals SY1-SYn and subsequent data DT. The preset time used in the steps 201, 202, and 204 is chosen to be equal to the time range occupied by the sync signals SY1-SYn. For example, the prescribed number of sync signals which is used in the steps 201 and 202 is equal to 3 when the number "n" of the sync signals SY1-SYn is equal to 5.

The features of the second embodiment of this invention are as follows. A determination is made as to whether or not at least the prescribed number of sync signals are successfully detected in the preset time on the basis of the value of the synchronization-locked-state deciding counter. The result of the determination is used to decide whether or not the synchronization is in the locked state. Furthermore, a determination is made as to whether or not at least the prescribed number of sync signals fail to be successfully detected in the preset time on the basis of the value of the synchronization-unlocked-state deciding counter. The result of the determination is used to decide whether or not the synchronization is in the unlocked state.

The second embodiment of this invention provides the following advantages. Even when the MSK mark detection pattern of an incoming sync signal has an allowable temporal fluctuation (bit shift), the incoming sync signal can be recognized as a true sync signal. Accordingly, incoming sync signals with allowable temporal fluctuations (bit shifts) are prevented from being overlooked. Thus, it is possible to enhance the accuracy and reliability of the generation of a timing signal in response to the detection of incoming sync signals.

The step 202 may be modified to determine whether or not a prescribed number of successive sync signals fail to be successfully detected on the basis of the value of the synchronization-unlocked-state deciding counter. In this case, when the prescribed number of successive sync signals fail to be successfully detected, the program advances from the step 202 to the step 203. Otherwise, the program advances from the step 202 to the step 204.

The step 202 may be modified to determine whether or not at least one sync signal fails to be successfully detected on the basis of the value of the synchronization-unlocked-state deciding counter. In this case, when at least one sync signal fails to be successfully detected, the program advances from the step 202 to the step 203. Otherwise, the program advances from the step 202 to the step 204.

The step 201 may be modified to determine whether or not a prescribed number of successive sync signals are successfully detected on the basis of the value of the synchronization-locked-state deciding counter. In this case, when the prescribed number of successive sync signals are successfully detected, the program advances from the step 201 to the step 113. Otherwise, the program advances from the step 201 to the step 204.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIG. 14.

Third Embodiment

A third embodiment of this invention is similar to the first or second embodiment thereof except for a design change described hereafter.

Figure 16:
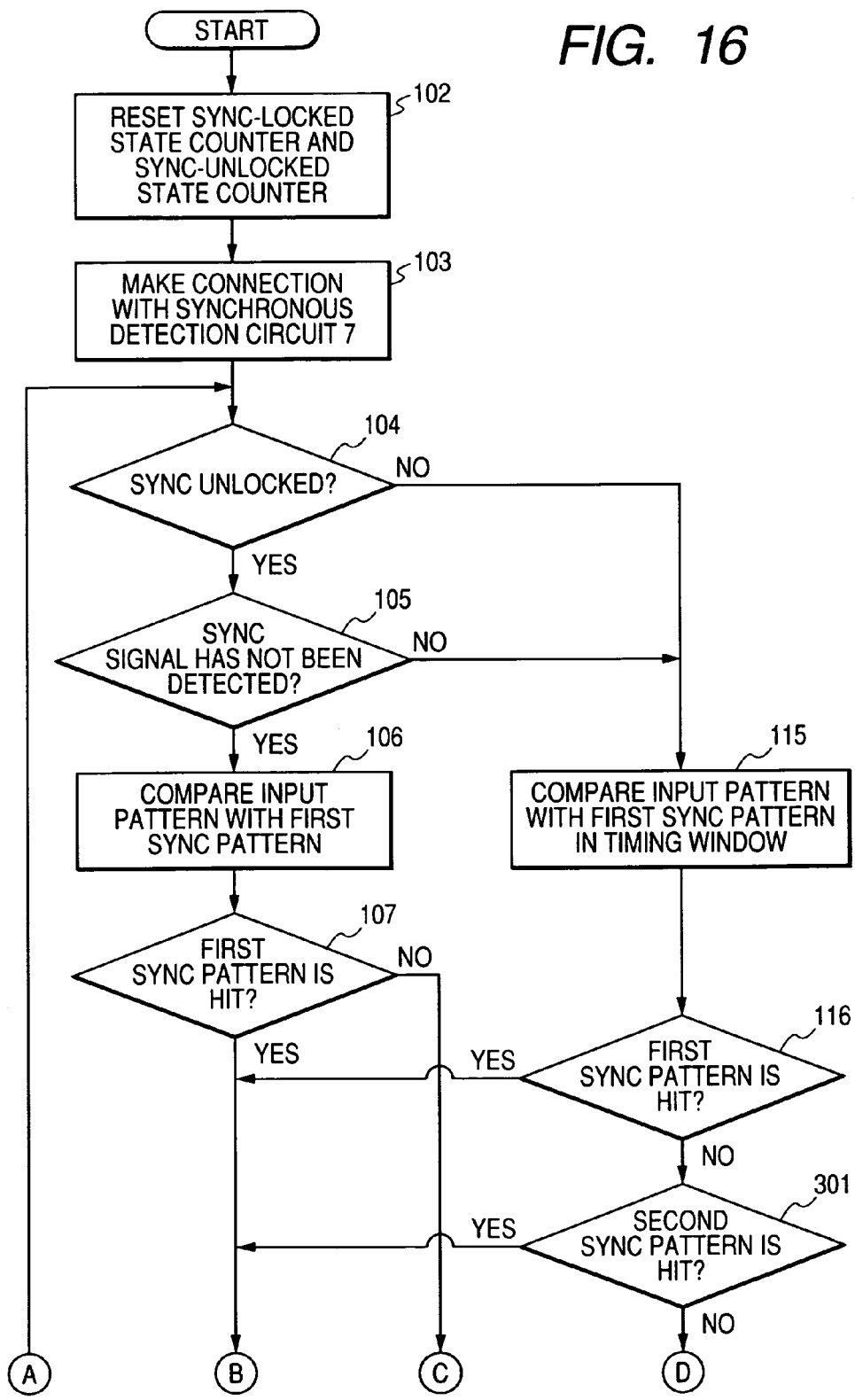
FIGS. 16 and 17 are a flowchart of a control program for the computer-based sync signal detection circuit in a third embodiment of this invention.
Figure 17:
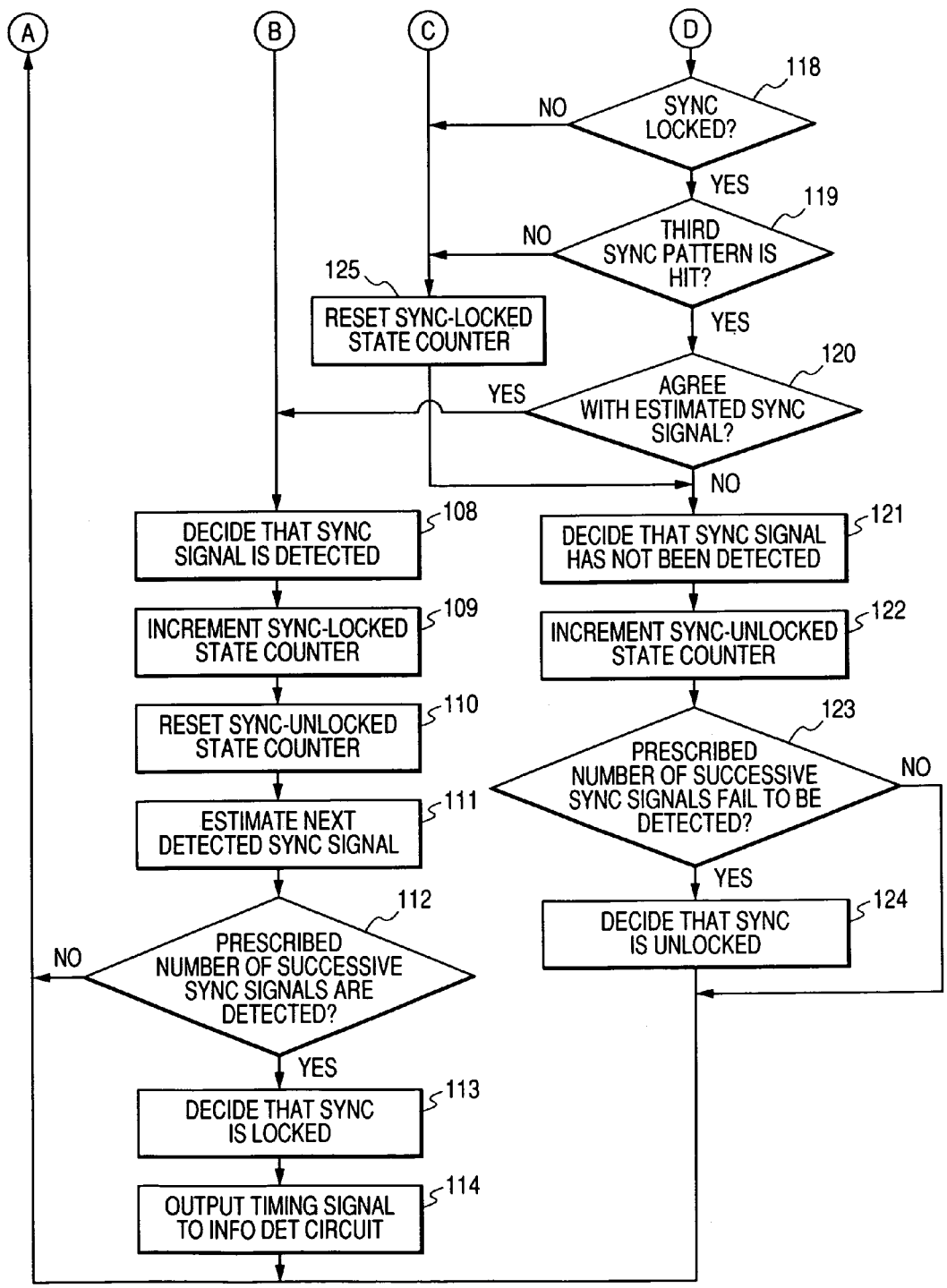

FIGS. 16 and 17 are a flowchart of a control program for the sync signal detection circuit 8A (see FIG. 9) in the third embodiment of this invention. The flowchart in FIGS. 16 and 17 replaces the flowchart in FIGS. 10 and 11 or that in FIG. 14.

The flowchart in FIGS. 16 and 17 has a step 301 instead of the step 117 (see FIG. 10). The step 301 compares the MSK mark detection pattern in question with the sub patterns in the second sync pattern. When the result of the comparison indicates that the MSK mark detection pattern in question agrees with one of the sub patterns in the second sync pattern, the program advances from the step 301 to the step 108. Accordingly, in this case, the program directly advances from the step 301 to the step 108 without stopping at the step 120. Thus, it is possible to easily and quickly determine at the step 108 that a sync signal is successfully detected. On the other hand, when the result of the comparison indicates that the MSK mark detection pattern in question agrees with none of the sub patterns in the second sync pattern, the program advances from the step 301 to the step 118.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIGS. 16 and 17.

Fourth Embodiment

A fourth embodiment of this invention is similar to one of the first to third embodiments thereof except for a design change described hereafter.

Figure 18:
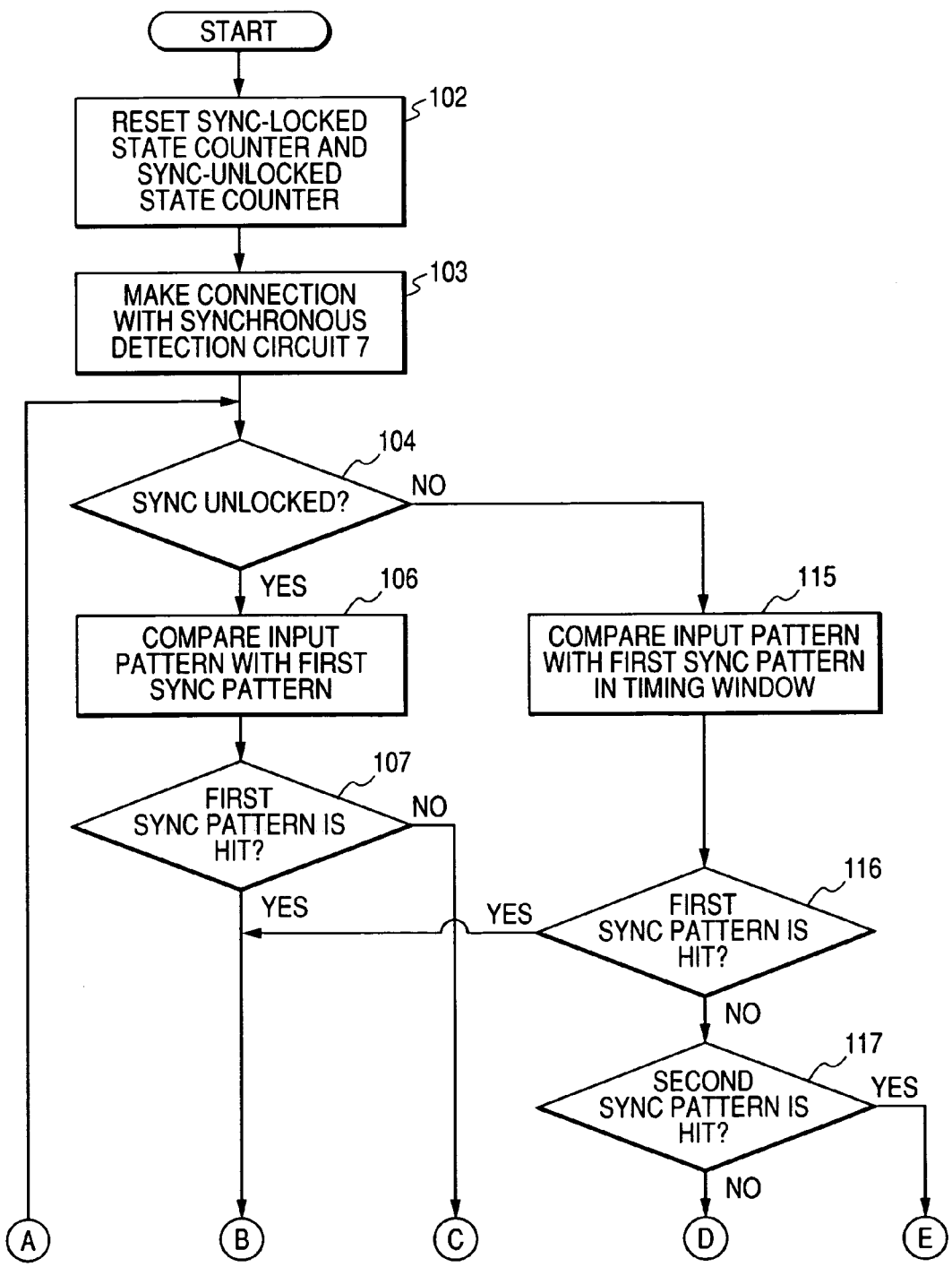
FIG. 18 is a flowchart of a portion of a control program for the computer-based sync signal detection circuit in a fourth embodiment of this invention.

FIG. 18 is a portion of a flowchart of a control program for the sync signal detection circuit 8A (see FIG. 9) in the fourth embodiment of this invention. The portion of the flowchart in FIG. 18 replaces the portion of the flowchart in FIG. 10 or FIG. 16.

The step 105 (see FIG. 10 or FIG. 16) is omitted from the portion of the flowchart in FIG. 18. Thus, the step 106 is directly connected with the step 104. The step 104 in FIG. 18 determines whether or not the synchronization is in the unlocked state on the basis of the value of the synchronization-unlocked-state deciding counter. When the synchronization is not in the unlocked state, the program advances from the step 104 to the step 115. On the other hand, when the synchronization is in the unlocked state, the program advances from the step 104 to the step 106. Accordingly, in this case, the program directly advances from the step 104 to the step 106 without stopping at the step 105 (see FIG. 10 or FIG. 16) which serves to determine whether or not a sync signal has been detected. Thus, the step 106 is enabled to promptly compare an MSK mark detection pattern of an incoming sync signal with the sub patterns in the first sync pattern. Therefore, it is possible to easily and quickly determine whether or not a sync signal is successfully detected.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIG. 18.

Fifth Embodiment

A fifth embodiment of this invention is similar to one of the first to fourth embodiments thereof except for a design change described hereafter.

Figure 19:
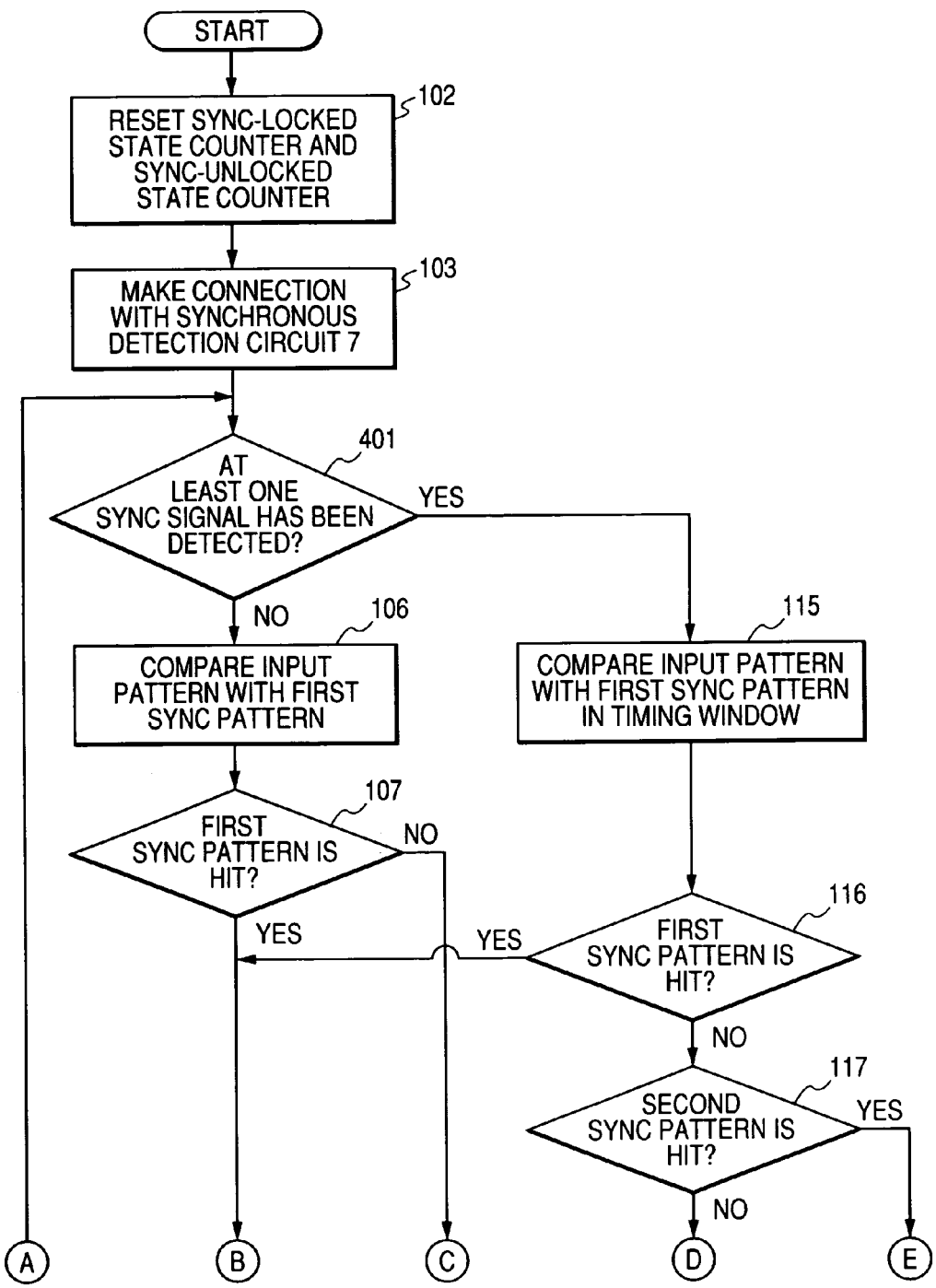
FIG. 19 is a flowchart of a portion of a control program for the computer-based sync signal detection circuit in a fifth embodiment of this invention.

FIG. 19 is a portion of a flowchart of a control program for the sync signal detection circuit 8A (see FIG. 9) in the fifth embodiment of this invention. The portion of the flowchart in FIG. 19 replaces the portion of the flowchart in FIG. 10, FIG. 16, or FIG. 18.

The portion of the flowchart in FIG. 19 has a step 401 instead of the combination of the steps 104 and 105 in FIG. 11 or FIG. 16 or the step 104 in FIG. 18. The step 401 determines whether or not at least one sync signal has been successfully detected on the basis of, for example, the value of the synchronization-locked-state deciding counter. When it is determined that at least one sync signal has been successfully detected, the program advances from the step 401 to the step 115. Otherwise, the program advances from the step 401 to the step 106.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIG. 19.

Sixth Embodiment

A sixth embodiment of this invention is similar to one of the first, second, fourth, and fifth embodiments thereof except for a design change described hereafter.

Figure 20:
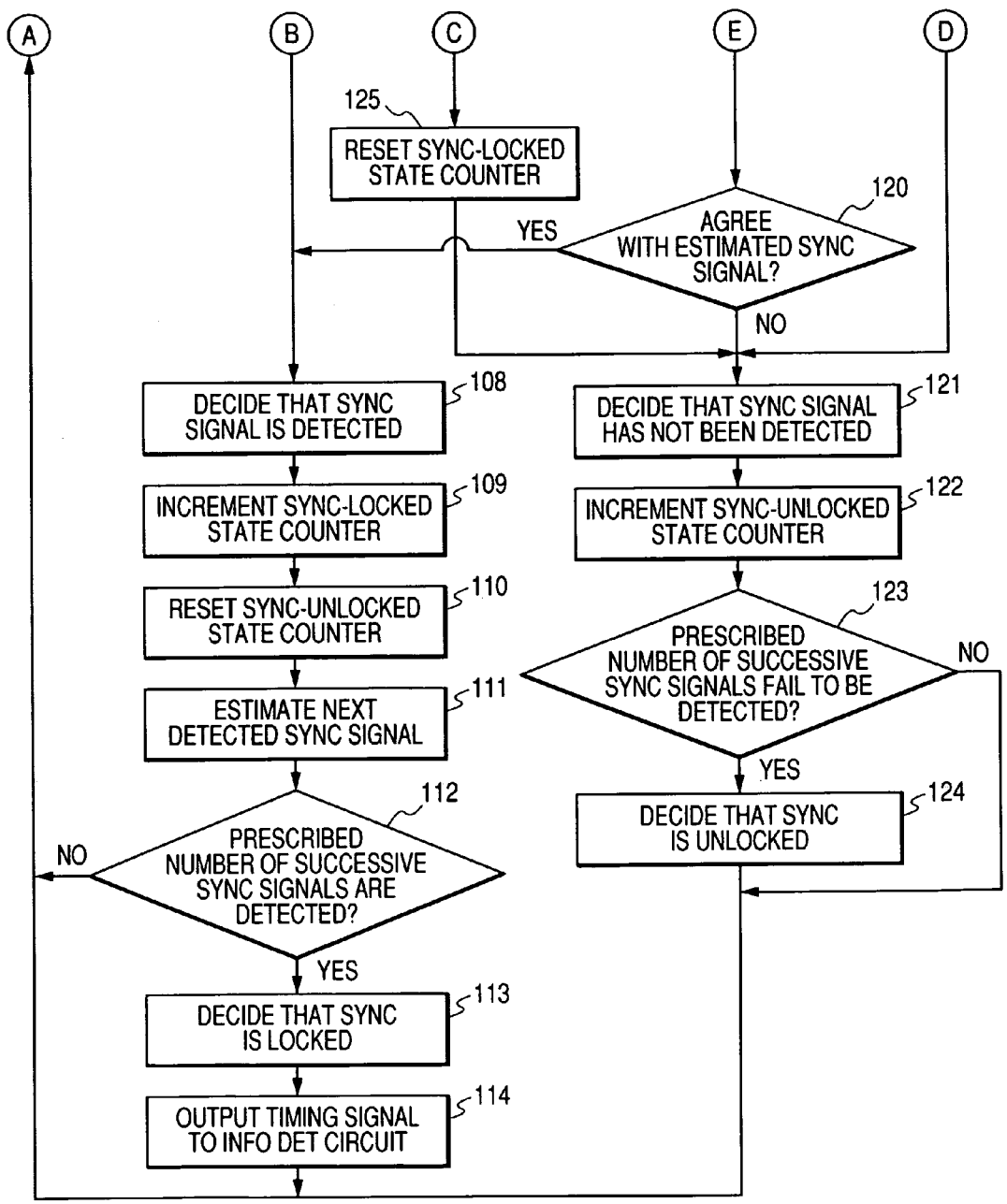
FIG. 20 is a flowchart of a portion of a control program for the computer-based sync signal detection circuit in a sixth embodiment of this invention.

FIG. 20 is a portion of a flowchart of a control program for the sync signal detection circuit 8A (see FIG. 9) in the sixth embodiment of this invention. The portion of the flowchart in FIG. 20 replaces the portion of the flowchart in FIG. 11 or FIG. 14.

The steps 118 and 119 (see FIG. 11 or FIG. 14) are omitted from the portion of the flowchart in FIG. 20. The step 117 (see FIG. 10, FIG. 18, or FIG. 19) compares the MSK mark detection pattern in question with the sub patterns in the second sync pattern. When the result of the comparison indicates that the MSK mark detection pattern in question agrees with one of the sub patterns in the second sync pattern, the program advances from the step 117 to the step 120. On the other hand, when the result of the comparison indicates that the MSK mark detection pattern in question agrees with none of the sub patterns in the second sync pattern, the program advances from the step 117 to the step 121. Accordingly, in this case, the program directly advances from the step 117 to the step 121 without stopping at the steps 118, 119, and 120 (see FIG. 11 or FIG. 14). Thus, the step 121 is enabled to promptly determine that a sync signal is not successfully detected. Therefore, it is possible to easily and quickly determine whether or not a sync signal is successfully detected.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIG. 20.

Seventh Embodiment

A seventh embodiment of this invention is similar to the third embodiment thereof except for a design change described hereafter.

Figure 21:
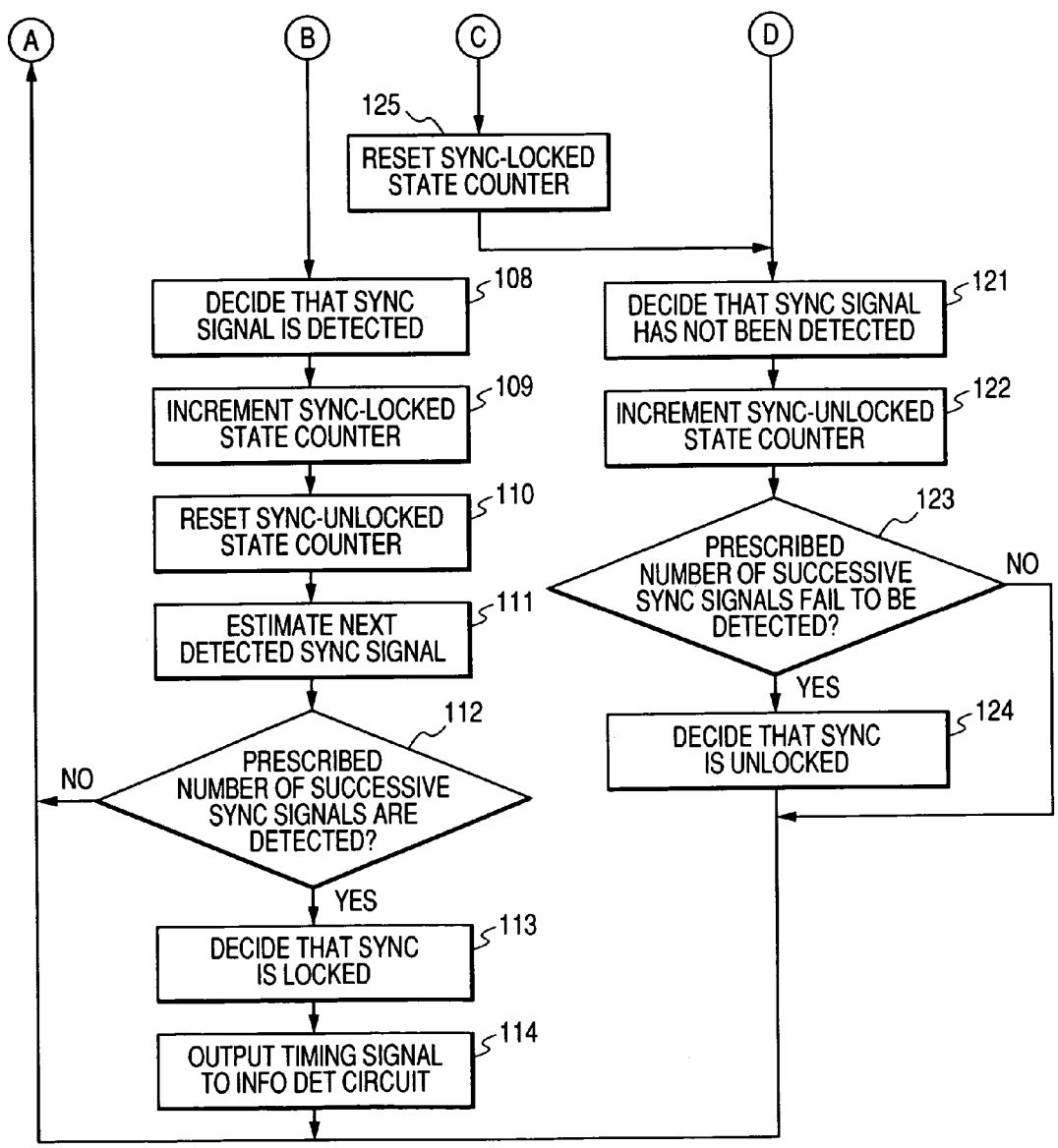
FIG. 21 is a flowchart of a portion of a control program for the computer-based sync signal detection circuit in a seventh embodiment of this invention.

FIG. 21 is a portion of a flowchart of a control program for the sync signal detection circuit 8A (see FIG. 9) in the seventh embodiment of this invention. The portion of the flowchart in FIG. 21 replaces the portion of the flowchart in FIG. 17.

The steps 118, 119, and 120 (see FIG. 17) are omitted from the portion of the flowchart in FIG. 21. The step 301 (see FIG. 16) compares the MSK mark detection pattern in question with the sub patterns in the second sync pattern. When the result of the comparison indicates that the MSK mark detection pattern in question agrees with one of the sub patterns in the second sync pattern, the program advances from the step 301 to the step 108. On the other hand, when the result of the comparison indicates that the MSK mark detection pattern in question agrees with none of the sub patterns in the second sync pattern, the program advances from the step 301 to the step 121. Accordingly, in this case, the program directly advances from the step 301 to the step 121 without stopping at the steps 118, 119, and 120 (see FIG. 17). Thus, the step 121 is enabled to promptly determine that a sync signal is not successfully detected. Therefore, it is possible to easily and quickly determine whether or not a sync signal is successfully detected.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIG. 21.

Eighth Embodiment

An eighth embodiment of this invention is similar to one of the first to seventh embodiments thereof except for design changes described hereafter. The eighth embodiment of this invention uses the synchronization-locked-state deciding counter only. In other words, the synchronization-unlocked-state deciding counter is omitted from the eighth embodiment of this invention.

Figure 22:
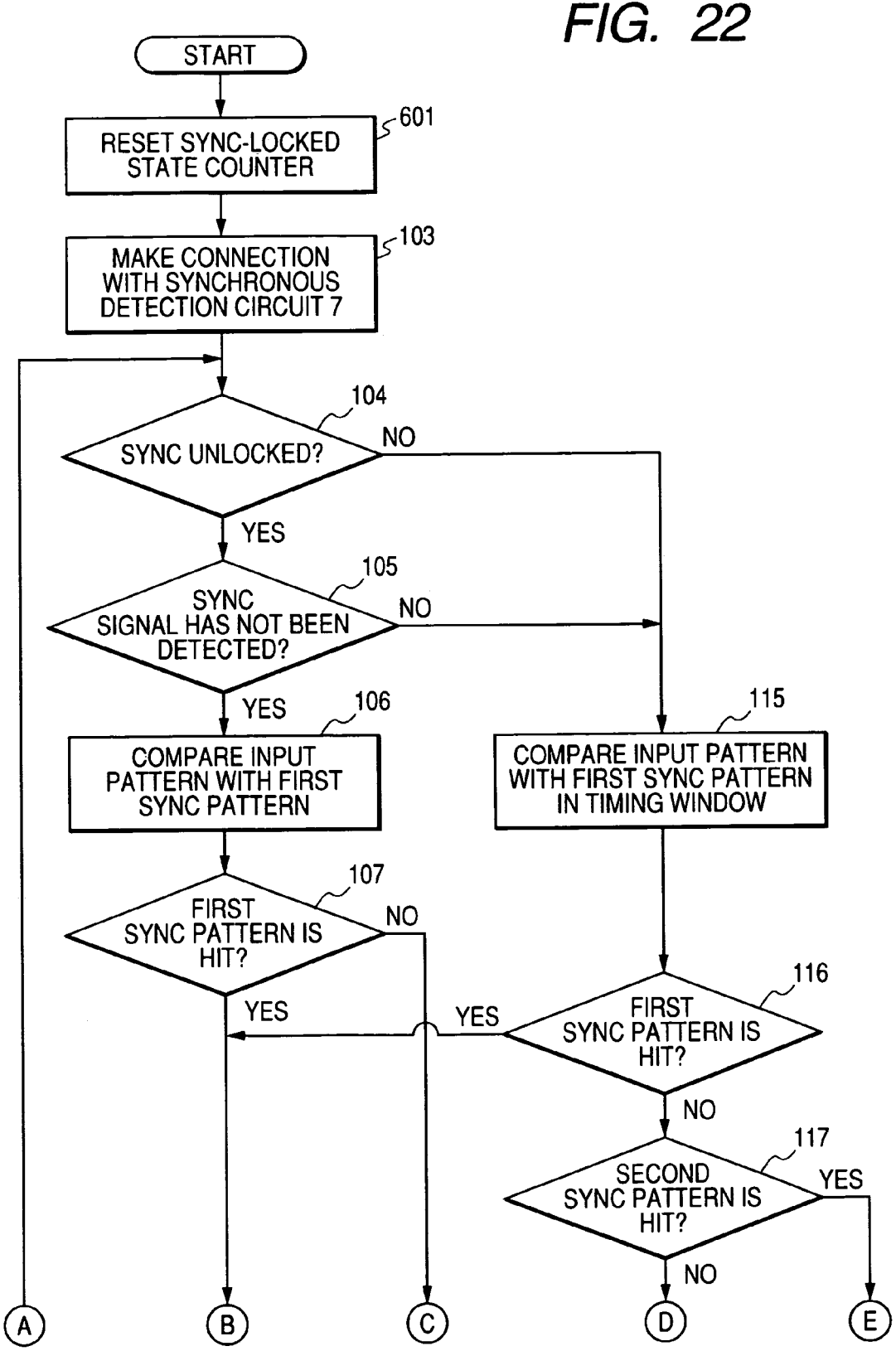
FIGS. 22 and 23 are a flowchart of a control program for the computer-based sync signal detection circuit in an eighth embodiment of this invention.
Figure 23:
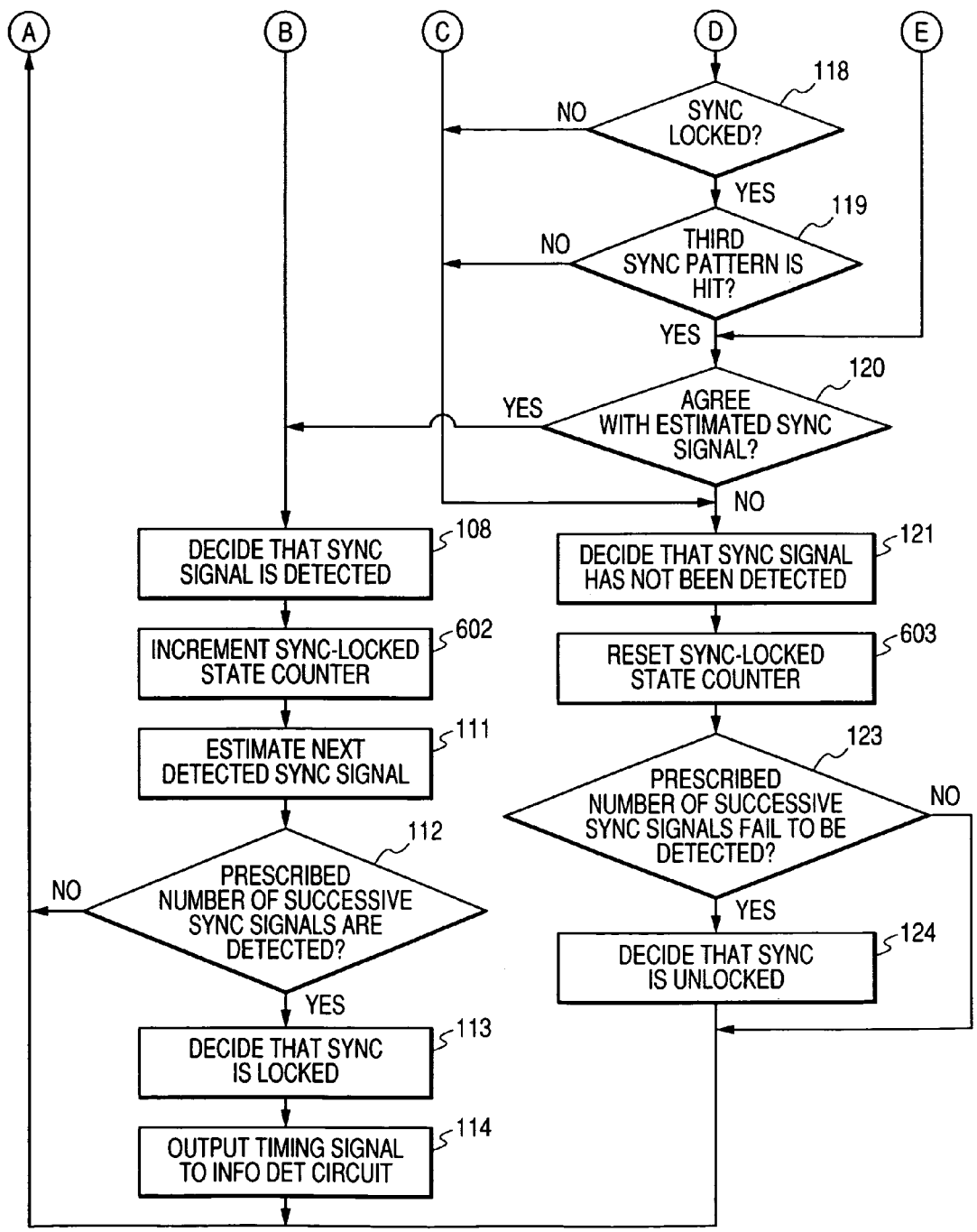

FIGS. 22 and 23 are a flowchart of a control program for the sync signal detection circuit 8A (see FIG. 9) in the eighth embodiment of this invention. The flowchart in FIGS. 22 and 23 replaces the flowchart in FIGS. 10 and 11, the flowchart in FIG. 14, the flowchart in FIGS. 16 and 17, the flowchart in FIG. 18, the flowchart in FIG. 19, the flowchart in FIG. 20, or the flowchart in FIG. 21.

The flowchart in FIGS. 22 and 23 has a step 601 instead of the step 102 (see FIG. 10, FIG. 16, FIG. 18, or FIG. 19). The step 601 initializes or resets the value of the synchronization-locked-state deciding counter to zero in response to the basic clock signal from the PLL 6 (see FIG. 1).

The flowchart in FIGS. 22 and 23 has a step 602 instead of the combination of the steps 109 and 110 (see FIG. 11, FIG. 14, FIG. 17, FIG. 20, or FIG. 21). The step 602 increments the value of the synchronization-locked-state deciding counter. The step 602 is followed by the step 111.

The step 125 (see FIG. 11, FIG. 17, FIG. 20, or FIG. 21) is omitted from the portion of the flowchart in FIG. 23. Thus, the step 121 is directly connected with the step 107 and with the steps 118 and 119.

Furthermore, the flowchart in FIGS. 22 and 23 has a step 603 instead of the step 122 (see FIG. 11, FIG. 14, FIG. 17, FIG. 20, or FIG. 21). The step 603 resets the value of the synchronization-locked-state deciding counter to zero. The step 603 is followed by the step 123 (see FIG. 23) or the step 202 (see FIG. 14).

In FIG. 23, the step 112 compares the value of the synchronization-locked-state deciding counter with a first prescribed value. When the result of the comparison indicates that the value of the synchronization-locked-state deciding counter is equal to or greater than the first prescribed value, the step 112 determines that a prescribed number of successive sync signals are successfully detected. On the other hand, when the result of the comparison indicates that the value of the synchronization-locked-state deciding counter is smaller than the first prescribed value, the step 112 determines that at least one among the prescribed number of successive sync signals is not successfully detected.

The step 112 may be replaced by the step 201 (see FIG. 14). In this case, the step 201 refers to the value of the synchronization-locked-state deciding counter and thereby determines whether or not at least a prescribed number of sync signals are successfully detected in a preset time.

In FIG. 23, the step 123 compares the value of the synchronization-locked-state deciding counter with a second prescribed value. When the result of the comparison indicates that the value of the synchronization-locked-state deciding counter is smaller than the second prescribed value, the step 123 determines that a prescribed number of successive sync signals fail to be successfully detected. On the other hand, when the result of the comparison indicates that the value of the synchronization-locked-state deciding counter is equal to or greater than the second prescribed value, the step 123 determines that at least one among the prescribed number of successive sync signals is successfully detected.

The step 123 may be replaced by the step 202 (see FIG. 14). In this case, the step 202 refers to the value of the synchronization-locked-state deciding counter and thereby determines whether or not at least a prescribed number of sync signals fail to be successfully detected in the preset time.

The omission of the synchronization-unlocked-state deciding counter simplifies the control program for the sync signal detection circuit 8A (see FIG. 9), and reduces the calculation load thereon.

It should be noted that the sync signal detection circuit 8A (see FIG. 9) may be replaced by the sync signal detection circuit 8 (see FIG. 1). In this case, the sync signal detection circuit 8 is modified to have functions corresponding to the steps in the control program in FIGS. 22 and 23.

Ninth Embodiment

A ninth embodiment of this invention is similar to one of the first to eighth embodiments thereof except for design changes described hereafter.

Every block of wobbling information has successively-arranged sync signals SY1, SY2, SY3, and SY4 which are followed by data DT. Each of the sync signals SY1, SY2, SY3, and SY4 has three MSK marks m1, m2, and m3. The sync signals SY1, SY2, SY3, and SY4 are different in relation among the time positions of the MSK marks m1, m2, and m3.

Figure 24:
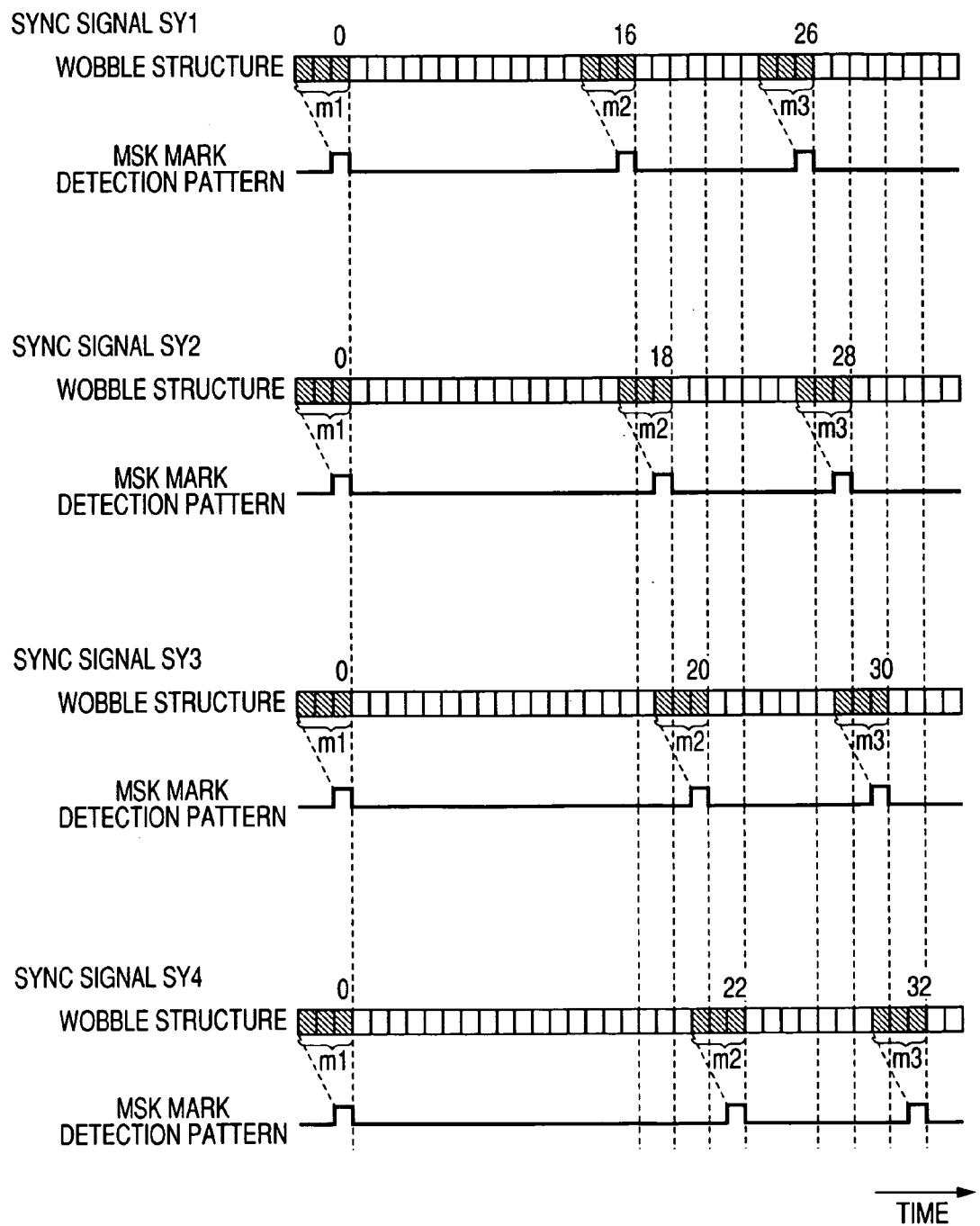
FIG. 24 is a time-domain diagram of the relation among sync signals, MSK marks, mono-tone wobble waves, and MSK mark detection patterns in a ninth embodiment of this invention.

As shown in FIG. 24, each of the sync signals SY1, SY2, SY3, and SY4 is composed of mono-tone wobble wave portions (fundamental wobble wave portions) and MSK marks m1, m2, and m3. The head of each of the sync signals SY1, SY2, SY3, and SY4 is occupied by the MSK mark m1. In each of the sync signals SY1, SY2, SY3, and SY4, a first mono-tone wobble wave portion extends between the MSK marks m1 and m2, and a second mono-tone wobble wave portion extends between the MSK marks m2 and m3. The sync signals SY1, SY2, SY3, and SY4 are different in time positions of the MSK marks m2 and m3. Specifically, the MSK mark m2 in the sync signal SY1 occupies the 14th, 15th, and 16th bit positions while the MSK mark m3 therein occupies the 24th, 25th, and 26th bit positions. The MSK mark m2 in the sync signal SY2 occupies the 16th, 17th, and 18th bit positions while the MSK mark m3 therein occupies the 26th, 27th, and 28th bit positions. The MSK mark m2 in the sync signal SY3 occupies the 18th, 19th, and 20th bit positions while the MSK mark m3 therein occupies the 28th, 29th, and 30th bit positions. The MSK mark m2 in the sync signal SY4 occupies the 20th, 21st, and 22nd bit positions while the MSK mark m3 therein occupies the 30th, 31st, and 32nd bit positions. Each of the MSK marks m1, m2, and m3 represents a bit sequence of "001". Every bit represented by the mono-tone wobble wave portions is "0". Thus, the sync signals SY1, SY2, SY3, and SY4 have different bit sequence patterns respectively. The order in which the sync signals SY1, SY2, SY3, and SY4 are recorded and reproduced is previously determined.

The synchronous detection circuit 7 (see FIG. 1) serves to detect every MSK mark in the output signal of the equalizer 4 (see FIG. 1). Upon the detection of every MSK mark, the synchronous detection circuit 7 outputs an MSK mark detection signal which takes a prescribed logical value for the third 1-bit-corresponding time range in the MSK mark duration. The last three MSK mark detection signals constitute an MSK mark detection pattern. MSK mark detection patterns for the sync signals SY1-SY4, that is, patterns formed by outputted MSK mark detection signals for the sync signals SY1-SY4, are shown in FIG. 24.

Specifically, for the sync signal SY1, MSK mark detection signals are outputted at the 0th bit position, the 16th bit position, and the 26th bit position respectively (see FIG. 24). Thus, an MSK mark detection pattern, that is, a pattern formed by the outputted MSK mark detection signals, is denoted by "0-16-26".

For the sync signal SY2, MSK mark detection signals are outputted at the 0th bit position, the 18th bit position, and the 28th bit position respectively (see FIG. 24). Thus, an MSK mark detection pattern, that is, a pattern formed by the outputted MSK mark detection signals, is denoted by "0-18-28".

For the sync signal SY3, MSK mark detection signals are outputted at the 0th bit position, the 20th bit position, and the 30th bit position respectively (see FIG. 24). Thus, an MSK mark detection pattern, that is, a pattern formed by the outputted MSK mark detection signals, is denoted by "0-20-30".

For the sync signal SY4, MSK mark detection signals are outputted at the 0th bit position, the 22nd bit position, and the 32nd bit position respectively (see FIG. 24). Thus, an MSK mark detection pattern, that is, a pattern formed by the outputted MSK mark detection signals, is denoted by "0-22-32".

As shown in FIG. 25, first, second, and third sync patterns are provided in connection with the sync signals SY1-SY4. The first sync pattern has sub patterns assigned to the sync signals SY1-SY4 respectively and being exactly equal to the MSK mark detection patterns for the sync signals SY1-SY4 respectively. The second sync pattern allows temporal fluctuations (bit shifts) with respect to the first sync pattern or with respect to the MSK mark detection patterns for the sync signals SY1-SY4, and has sub patterns each assigned to one of the sync signals SY1-SY4 and hence being capable of identifying one of the sync signals SY1-SY4. The third sync pattern allows temporal fluctuations (bit shifts) with respect to the first sync pattern or with respect to the MSK mark detection patterns for the sync signals SY1-SY4, and has sub patterns each corresponding to two or more of the sync signals SY1-SY4.

In FIG. 25, the first sync pattern has a sub pattern of "0-16-26", a sub pattern of "0-18-28", a sub pattern of "0-20-30", and a sub pattern of "0-22-32" which are assigned to the sync signals SY1, SY2, SY3, and SY4 respectively, and which are exactly equal to the MSK mark detection patterns for the sync signals SY1, SY2, SY3, and SY4 respectively.

The second sync pattern has a sub pattern of "0-15-25", a sub pattern of "0-17-26", a sub pattern of "0-16-27", a sub pattern of "0-16-25", and a sub pattern of "0-15-26" assigned to the sync signal SY1. The sub patterns assigned to the sync signal SY1 differ from the MSK mark detection pattern for the sync signal SY1, and hence allow temporal fluctuations (bit shifts) with respect to the MSK mark detection pattern for the sync signal SY1. The second sync pattern has a sub pattern of "0-19-28", a sub pattern of "0-18-29", a sub pattern of "0-18-27", and a sub pattern of "0-17-28" assigned to the sync signal SY2. The sub patterns assigned to the sync signal SY2 differ from the MSK mark detection pattern for the sync signal SY2, and hence allow temporal fluctuations (bit shifts) with respect to the MSK mark detection pattern for the sync signal SY2. The second sync pattern has a sub pattern of "0-21-30", a sub pattern of "0-20-31", a sub pattern of "0-20-29", and a sub pattern of "10-19-30" assigned to the sync signal SY3. The sub patterns assigned to the sync signal SY3 differ from the MSK mark detection pattern for the sync signal SY3, and hence allow temporal fluctuations (bit shifts) with respect to the MSK mark detection pattern for the sync signal SY3. The second sync pattern has a sub pattern of "0-23-32", a sub pattern of "0-22-33", a sub pattern of "0-22-31", a sub pattern of "0-23-33", and a sub pattern of "0-21-32" assigned to the sync signal SY4. The sub patterns assigned to the sync signal SY4 differ from the MSK mark detection pattern for the sync signal SY4, and hence allow temporal fluctuations (bit shifts) with respect to the MSK mark detection pattern for the sync signal SY4. None of the sub patterns in the second sync pattern is assigned in common to two or more of the sync signals SY1-SY4. Accordingly, each of the sub patterns can identify corresponding one of the sync signals SY1-SY4.

The third sync pattern has a sub pattern of "0-17-27" assigned to the sync signal SY1. The sub pattern assigned to the sync signal SY1 differs from the MSK mark detection pattern for the sync signal SY1, and hence allow a temporal fluctuation (bit shift) with respect to the MSK mark detection pattern for the sync signal SY1. The third sync pattern has a sub pattern of "0-17-27" and a sub pattern of "0-19-29" assigned to the sync signal SY2. The sub patterns assigned to the sync signal SY2 differ from the MSK mark detection pattern for the sync signal SY2, and hence allow temporal fluctuations (bit shifts) with respect to the MSK mark detection pattern for the sync signal SY2. The third sync pattern has a sub pattern of "0-19-29" and a sub pattern of "0-21-31" assigned to the sync signal SY3. The sub patterns assigned to the sync signal SY3 differ from the MSK mark detection pattern for the sync signal SY3, and hence allow temporal fluctuations (bit shifts) with respect to the MSK mark detection pattern for the sync signal SY3. The third sync pattern has a sub pattern of "0-21-31" assigned to the sync signal SY4. The sub pattern assigned to the sync signal SY4 differs from the MSK mark detection pattern for the sync signal SY4, and hence allow a temporal fluctuation (bit shift) with respect to the MSK mark detection pattern for the sync signal SY4. Thus, a sub pattern of "0-17-27" is assigned in common to the sync signals SY1 and SY2. In addition, a sub pattern of "0-19-29" is assigned in common to the sync signals SY2 and SY3. Furthermore, a sub pattern of "0-21-31" is assigned in common to the sync signals SY3 and SY4.

Figure 26:
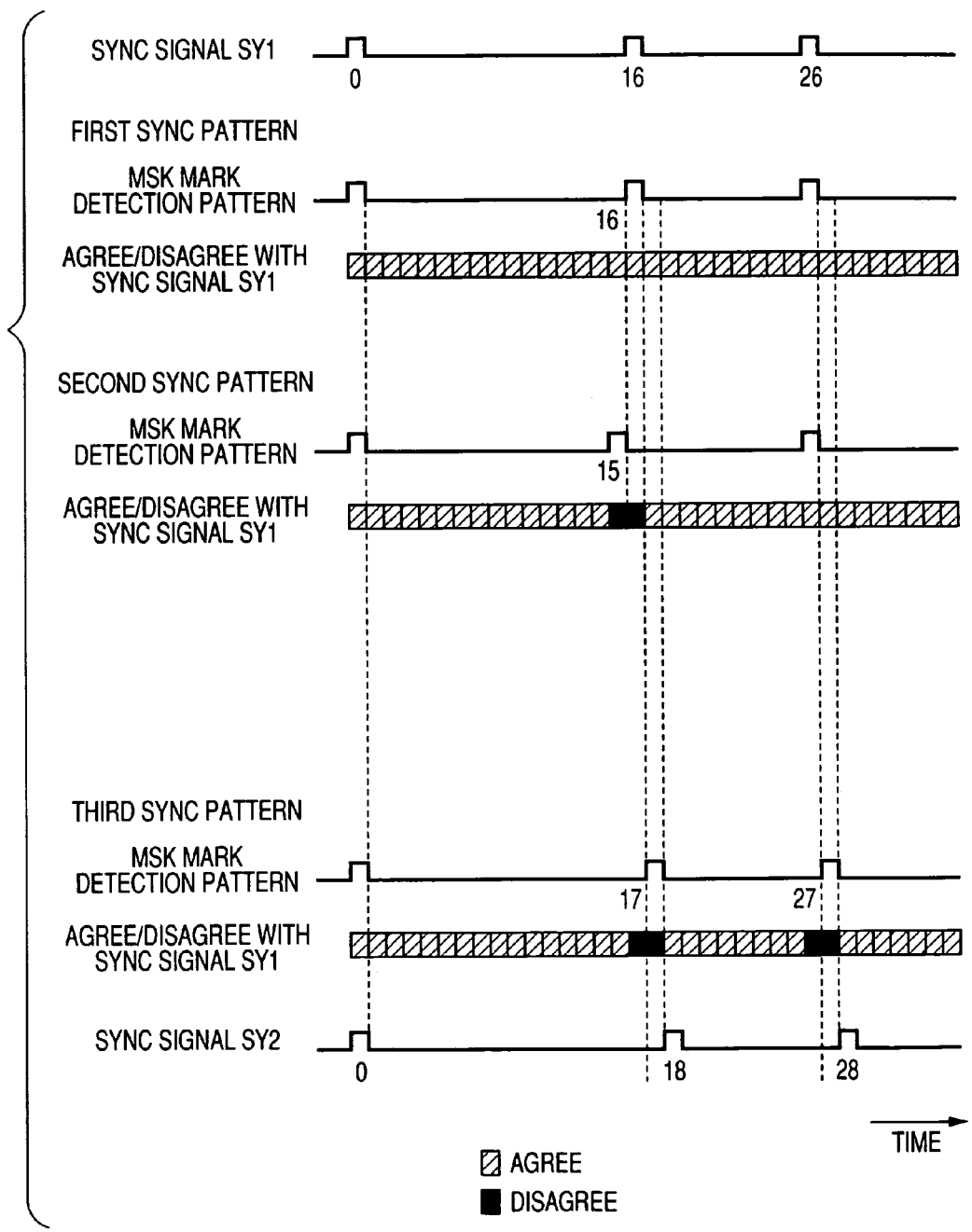
FIG. 26 is a time-domain diagram of the relation among sync signals SY1 and SY2, and the first, second, and third sync patterns in the ninth embodiment of this invention.

With reference to FIG. 26, an MSK mark detection pattern of "0-16-26" is correctly obtained for the sync signal SY1. The obtained MSK mark detection pattern agrees with a sub pattern of "0-16-26" in the first sync pattern which is assigned to the sync signal SY1 in all bits.

The obtained MSK mark detection pattern "0-16-26" disagrees with a sub pattern of "0-15-26" in the second sync pattern which is assigned to the sync signal SY1 in only two bits at the 15th and 16th positions. There is only a 1-bit difference in position of the MSK mark m2 between the obtained MSK mark detection pattern "0-16-26" and a sub pattern of "0-15-26" in the second sync pattern. A sub pattern of "0-15-26" in the second sync pattern differs from a correct MSK mark detection pattern "0-18-28" for the sync signal SY2 in that at least a 2-bit difference in positions of the MSK marks m2 and m3 are present between them. A sub pattern of "0-15-26" in the second sync pattern differs from a correct MSK mark detection pattern "0-20-30" for the sync signal SY3 in that at least a 4-bit difference in positions of the MSK marks m2 and m3 are present between them. A sub pattern of "0-15-26" in the second sync pattern differs from a correct MSK mark detection pattern "0-22-32" for the sync signal SY4 in that at least a 6-bit difference in positions of the MSK marks m2 and m3 are present between them. Accordingly, provided that predetermined conditions mentioned later are satisfied, a sub pattern of "0-15-26" in the second sync pattern is selected as one corresponding to a sync signal SY1 in which the MSK mark m2 shifts forward from the original position by a 1-bit distance.

The obtained MSK mark detection pattern "0-16-26" disagrees with a sub pattern of "0-17-27" in the third sync pattern which is assigned to the sync signals SY1 and SY2 in only four bits at the 16th, 17th, 26th, and 27th positions. A correct MSK mark detection pattern "0-18-28" of the sync signal SY2 disagrees with a sub pattern of "0-17-27" in the third sync pattern in only four bits at the 17th, 18th, 27th, and 28th positions. It is difficult to decide which of a sync signal SY1 where the MSK marks m2 and m3 shift backward from the original positions by a 1-bit distance and a sync signal SY2 where the MSK marks m2 and m3 shift forward from the original positions by a 1-bit distance a sub pattern of "0-17-27" in the third sync pattern corresponds to. Accordingly, provided that predetermined conditions mentioned later are satisfied, a sub pattern of "0-17-27" in the third sync pattern is regarded as one corresponding to either a sync signal SY1 or a sync signal SY2.

Figure 27:
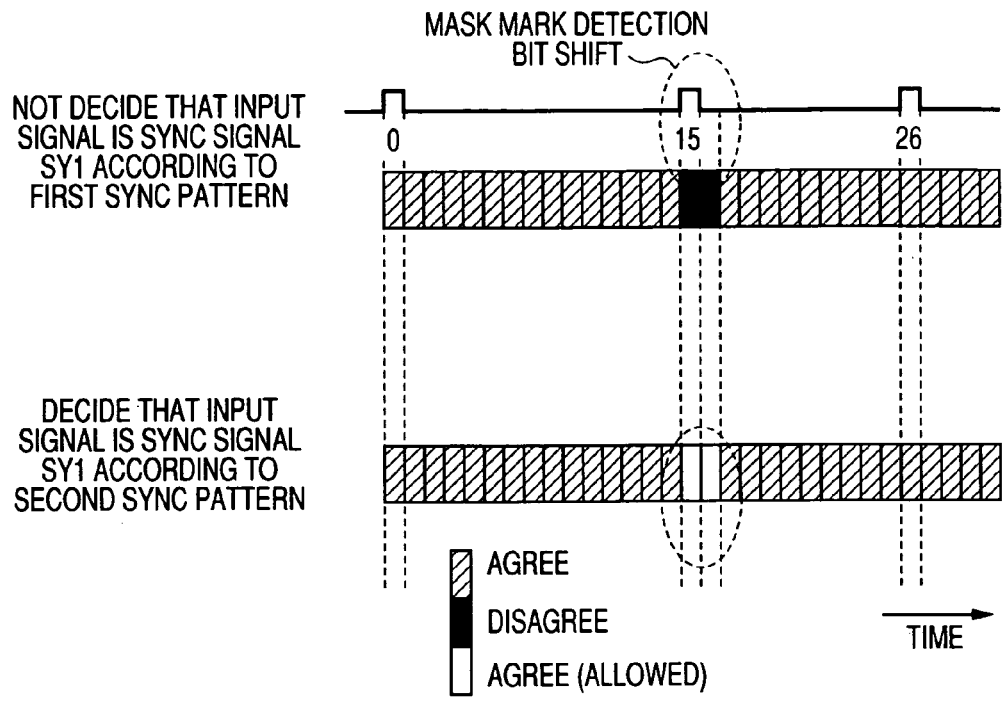
FIG. 27 is a time-domain diagram of an MSK mark detection pattern and the first and second sync patterns in the ninth embodiment of this invention.

With reference to FIG. 27, there is an MSK mark detection pattern "0-15-26" of a sync signal which is represented by the output signal of the synchronous detection circuit 7 (see FIG. 1). For example, the MSK mark detection pattern "0-15-26" originates from the sync signal SY1 corresponding to an MSK mark detection pattern of "0-16-26" under poor wobbling-information detecting conditions where the MSK mark m2 in the sync signal SY1 is detected at the 15th bit position which precedes the original bit position (the 16th bit position) by one bit. The MSK mark detection pattern "0-15-26" means that the MSK marks m1, m2, and m3 are detected at the 0th, 15th, and 26th bit positions respectively.

A description will be given of the case where the MSK mark detection pattern "0-15-26" is compared with a sub pattern of "0-16-26" in the first sync pattern which is assigned to the sync signal SY1. In this case, the MSK mark detection pattern "0-15-26" and the sub pattern "0-16-26" disagree with each other in logic states taken at the 15th and 16th bit positions. Therefore, it is not determined that a sync signal SY1 is detected. This case corresponds to one of the following operation procedures D1 and D2 in FIGS. 10 and 11. D1: The step 104 determines that the synchronization is in the unlocked state, and then the step 105 determines that a sync signal has not been detected. Thereafter, the step 107 determines that the MSK mark detection pattern in question agrees with none of the sub patterns in the first sync pattern. D2: The step 104 determines that the synchronization is not in the unlocked state, or the step 105 determines that a sync signal has been detected. Then, the step 116 determines that the MSK mark detection pattern in question agrees with none of the sub patterns in the first sync pattern.

A description will be given of the case where the MSK mark detection pattern "0-15-26" is compared with a sub pattern of "0-15-26" in the second sync pattern which is assigned to the sync signal SY1. In this case, the MSK mark detection pattern "0-15-26" and the sub pattern "0-15-26" completely agree with each other. Therefore, it is determined that a sync signal SY1 is detected. This case corresponds to the following operation procedure E1 in FIGS. 10 and 11. E1: The step 116 determines that the MSK mark detection pattern in question agrees with none of the sub patterns in the first sync pattern, and then the step 117 determines that the MSK mark detection pattern in question agrees with one of the sub patterns in the second sync pattern. Thereafter, the step 120 determines that the hit sub pattern in the second sync pattern is one assigned to a sync signal estimated to be detected next to the previously detected sync signal.

Figure 28:
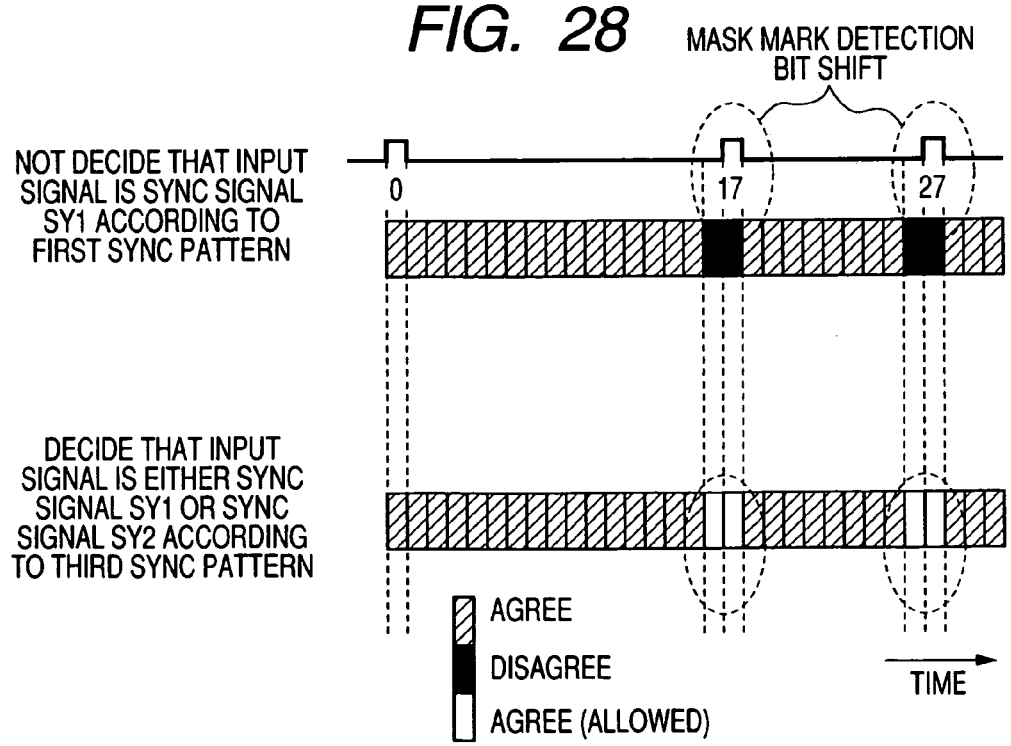
FIG. 28 is a time-domain diagram of an MSK mark detection pattern and the first and third sync patterns in the ninth embodiment of this invention.

With reference to FIG. 28, there is an MSK mark detection pattern "0-17-27" of a sync signal which is represented by the output signal of the synchronous detection circuit 7 (see FIG. 1). For example, the MSK mark detection pattern "0-17-27" originates from the sync signal SY1 corresponding to an MSK mark detection pattern of "0-16-26" under poor wobbling-information detecting conditions where the MSK marks m2 and m3 in the sync signal SY1 are detected at the 17th and 27th bit positions which follow the original bit positions (the 16th and 26th bit positions) by one bit respectively. According to another example, the MSK mark detection pattern "0-17-27" originates from the sync signal SY2 corresponding to an MSK mark detection pattern of "0-18-28" under poor wobbling-information detecting conditions where the MSK marks m2 and m3 in the sync signal SY2 are detected at the 17th and 27th bit positions which precede the original bit positions (the 18th and 28th bit positions) by one bit respectively. The MSK mark detection pattern "0-17-27" means that the MSK marks m1, m2, and m3 are detected at the 0th, 17th, and 27th bit positions respectively.

A description will be given of the case where the MSK mark detection pattern "0-17-27" is compared with a sub pattern of "0-16-26" in the first sync pattern which is assigned to the sync signal SY1. In this case, the MSK mark detection pattern "0-17-27" and the sub pattern "0-16-26" disagree with each other in logic states taken at the 16th and 17th bit positions. Therefore, it is not determined that a sync signal SY1 is detected. This case corresponds to one of the previously-mentioned operation procedures D1 and D2 in FIGS. 10 and 11.

A description will be given of the case where the MSK mark detection pattern "0-17-27" is compared with a sub pattern of "0-17-27" in the third sync pattern which is assigned in common to the sync signals SY1 and SY2. In this case, the MSK mark detection pattern "0-17-25" and the sub pattern "0-17-25" completely agree with each other. Under conditions where the synchronization continues to be in the locked state and a sync signal estimated to be detected next is one denoted by SY1, it is determined that a sync signal SY1 is detected. On the other hand, under conditions where the synchronization continues to be in the locked state and a sync signal estimated to be detected next is one denoted by SY2, it is determined that a sync signal SY2 is detected. This case corresponds to the following operation procedure F1 in FIGS. 10 and 11. F1: The step 104 determines that the synchronization is not in the unlocked state, or the step 105 determines that a sync signal has been detected. Thereafter, the step 116 determines that the MSK mark detection pattern in question agrees with none of the sub patterns in the first sync pattern, and then the step 117 determines that the MSK mark detection pattern in question agrees with none of the sub patterns in the second sync pattern. Subsequently, the step 119 determines that the MSK mark detection pattern in question agrees with one of the sub patterns in the third sync pattern. Then, the step 120 determines that the hit sub pattern in the third sync pattern is one assigned to a sync signal estimated to be detected next to the previously detected sync signal.

Tenth Embodiment

A tenth embodiment of this invention is similar to one of the first to ninth embodiments thereof except for design changes described hereafter. In the tenth embodiment of this invention, each of the MSK marks m1, m2, and m3 represents a bit sequence different from "001". Each of the MSK marks m1, m2, and m3 may have 2 bits, 4 bits, or more bits.

Eleventh Embodiment

An eleventh embodiment of this invention is similar to one of the first to tenth embodiments thereof except for a design change described hereafter. In the eleventh embodiment of this invention, the wobbling information is modulated on a bi-phase basis or a sawtooth-waveform basis.

Twelfth Embodiment

A twelfth embodiment of this invention is similar to one of the first to eleventh embodiments thereof except for a design change described hereafter. In the twelfth embodiment of this invention, the sync signal deciding section 17 and the synchronization state deciding section 20 are formed by a common section.

What is claimed is:

1. A method of detecting sync signals having different patterns respectively, the method comprising the steps of:
   a) comparing a pattern of an input sync signal with sub patterns in a first sync pattern to determine whether or not the pattern of the input sync signal agrees with one of the sub patterns in the first sync pattern, wherein the sub patterns in the first sync pattern are equal to the patterns of the sync signals respectively;
   b) in a case where the step a) determines that the pattern of the input sync signal agrees with none of the sub patterns in the first sync pattern, comparing the pattern of the input sync signal with sub patterns in a second sync pattern to determine whether or not the pattern of the input sync signal agrees with one of the sub patterns in the second sync pattern, wherein the sub patterns in the second sync pattern have temporal fluctuations with respect to the patterns of the sync signals, and each of the sub patterns in the second sync pattern is assigned to only one of the sync signals; c) determining that a sync signal is detected in one of (1) a case where the step a) determines that the pattern of the input sync signal agrees with one of the sub patterns in the first sync pattern and (2) a case where the step b) determines that the pattern of the input sync signal agrees with one of the sub patterns in the second sync pattern;
   d) determining whether synchronization is in a locked state or an unlocked state in response to a result of the determining by the step c);
   e) performing the step a) when the step d) determines that the synchronization is in the locked state;
   f) determining whether or not a sync signal has been detected when the step d) determines that the synchronization is in the unlocked state;
   g) in a case where the step f) determines that a sync signal has not been detected, comparing the pattern of the input sync signal with the sub patterns in the first sync pattern to determine whether or not the pattern of the input sync signal agrees with one of the sub patterns in the first sync pattern;
   h) determining that a sync signal is detected in a case where the step g) determines that the pattern of the input sync signal agrees with one of the sub patterns in the first sync pattern; and
   i) determining that a sync signal is not detected in a case where the step g) determines that the pattern of the input sync signal agrees with none of the sub patterns in the first sync pattern.

2. A method as recited in claim 1, further comprising the steps of:
   j) in a case where the step a) determines that the pattern of the input sync signal agrees with none of the sub patterns in the first sync pattern and the step b) determines that the pattern of the input sync signal agrees with none of the sub patterns in the second sync pattern, comparing the pattern of the input sync signal with sub patterns in a third sync pattern to determine whether or not the pattern of the input sync signal agrees with one of the sub patterns in the third sync pattern, wherein the sub patterns in the third sync pattern have temporal fluctuations with respect to the patterns of the sync signals, and each of the sub patterns in the third sync pattern is assigned in common to at least two of the sync signals;
   k) estimating a sync signal to be detected; and
   l) determining that a sync signal is detected in a case where the step j) determines that the pattern of the input sync signal agrees with one of the sub patterns in the third sync pattern and the sync signal estimated by the step k) is equal to the sync signal to which said one of the sub patterns in the third sync pattern is assigned.

3. A method as recited in claim 1, further comprising the step of reproducing a sync signal from a recording medium to get the input sync signal, wherein the recording medium comprises an optical recording medium, and sync signals are recorded on the optical disc as a wobble of a track.

4. A method as recited in claim 1, further comprising the step of generating a timing signal for reading data following the input sync signal in response to a result of the determining by the step c) and a result of the determining by the step d).

5. A method as recited in claim 1, further comprising the step of performing the step a) in a case where the step f) determines that a sync signal has been detected.

6. A method as recited in claim 1, wherein the step d) comprises determining that the synchronization is in the locked state in a case where results of the determining by the step c) indicate that a prescribed number of successive sync signals are detected, and otherwise determining that the synchronization is in the unlocked state.

7. A method as recited in claim 1, wherein the step d) comprises determining that the synchronization is in the locked state in a case where results of the determining by the step c) indicate that a prescribed number of sync signals are detected in a preset time, and otherwise determining that the synchronization is in the unlocked state.

8. A method as recited in claim 1, further comprising the steps of:
   j) determining whether at least one sync signal has been detected; and
   k) performing the step a) when the step i) determines that at least one sync signal has been detected.

9. A method as recited in claim 1, further comprising the steps of:
   j) performing the step a) in a case where the step f) determines that a sync signal has been detected;
   k) estimating a sync signal to be detected;
   l) inhibiting the step c) from determining that a sync signal is detected in a case where the sync signal estimated by the step k) is different from the sync signal to which said one of the sub patterns in the second sync pattern is assigned; and
   m) determining that a sync signal is not detected in a case where the sync signal estimated by the step k) is different from the sync signal to which said one of the sub patterns in the second sync pattern is assigned.

10. A method as recited in claim 1, further comprising the steps of:
   j) performing the step a) in a case where the step f) determines that a sync signal has been detected; and
   k) determining that a sync signal is not detected in a case where the step b) determines that the pattern of the input sync signal agrees with none of the sub patterns in the second sync pattern.

11. A method of detecting sync signals having different patterns respectively, the method comprising the steps of:
   a) comparing a pattern of an input sync signal with sub patterns in a first sync pattern to determine whether or not the pattern of the input sync signal agrees with one of the sub patterns in the first sync pattern, wherein the sub patterns in the first sync pattern are equal to the patterns of the sync signals respectively;
   b) in a case where the step a) determines that the pattern of the input sync signal agrees with none of the sub patterns in the first sync pattern, comparing the pattern of the input sync signal with sub patterns in a second sync pattern to determine whether or not the pattern of the input sync signal agrees with one of the sub patterns in the second sync pattern, wherein the sub patterns in the second sync pattern have temporal fluctuations with respect to the patterns of the sync signals, and each of the sub patterns in the second sync pattern is assigned to only one of the sync signals;
   c) determining that a sync signal is detected in one of (1) a case where the step a) determines that the Pattern of the input sync signal agrees with one of the sub patterns in the first sync pattern and (2) a case where the step b) determines that the pattern of the input sync signal agrees with one of the sub patterns in the second sync pattern;
   d) determining whether synchronization is in a locked state or an unlocked state in response to a result of the determining by the step c);
   e) performing the step a) when the step d) determines that the synchronization is in the locked state;
   f) in a case where the step d) determines that the synchronization is in the unlocked state, comparing the pattern of the input sync signal with the sub patterns in the first sync pattern to determine whether or not the pattern of the input sync signal agrees with one of the sub patterns in the first sync pattern;
   g) determining that a sync signal is detected in a case where the step f) determines that the pattern of the input sync signal agrees with one of the sub patterns in the first sync pattern; and
   h) determining that a sync signal is not detected in a case where the step f) determines that the pattern of the input sync signal agrees with none of the sub patterns in the first sync pattern.

12. An apparatus for detecting sync signals having different patterns respectively, the apparatus comprising:
   first means for comparing a pattern of an input sync signal with sub patterns in a first sync pattern to determine whether or not the pattern of the input sync signal agrees with one of the sub patterns in the first sync pattern, wherein the sub patterns in the first sync pattern are equal to the patterns of the sync signals respectively;
   second means for, in a case where the first means determines that the pattern of the input sync signal agrees with none of the sub patterns in the first sync pattern, comparing the pattern of the input sync signal with sub patterns in a second sync pattern to determine whether or not the pattern of the input sync signal agrees with one of the sub patterns in the second sync pattern, wherein the sub patterns in the second sync pattern have temporal fluctuations with respect to the patterns of the sync signals, and each of the sub patterns in the second sync pattern is assigned to only one of the sync signals;
   third means for determining that a sync signal is detected in one of (1) a case where the first means determines that the pattern of the input sync signal agrees with one of the sub patterns in the first sync pattern and (2) a case where the second means determines that the pattern of the input sync signal agrees with one of the sub patterns in the second sync pattern;
   fourth means for determining whether synchronization is in a locked state or an unlocked state in response to a result of the determining by the third means;
   fifth means for activating the first means when the fourth means determines that the synchronization is in the locked state;
   sixth means for determining whether or not a sync signal has been detected when the fourth means determines that the synchronization is in the unlocked state;
   seventh means for, in a case where the sixth means determines that a sync signal has not been detected, comparing the pattern of the input sync signal with the sub patterns in the first sync pattern to determine whether or not the pattern of the input sync signal agrees with one of the sub patterns in the first sync pattern;
   eighth means for determining that a sync signal is detected in a case where the seventh means determines that the pattern of the input sync signal agrees with one of the sub patterns in the first sync pattern; and
   ninth means for determining that a sync signal is not detected in a case where the seventh means determines that the pattern of the input sync signal agrees with none of the sub patterns in the first sync pattern.

13. An apparatus as recited in claim 12, further comprising means for activating the first means in a case where the sixth means determines that a sync signal has been detected.

14. An apparatus as recited in claim 12, further comprising:
   tenth means for activating the first means in a case where the sixth means determines that a sync signal has been detected;
   eleventh means for estimating a sync signal to be detected;
   twelfth means for inhibiting the third means from determining that a sync signal is detected in a case where the sync signal estimated by the eleventh means is different from the sync signal to which said one of the sub patterns in the second sync pattern is assigned; and
   thirteenth means for determining that a sync signal is not detected in a case where the sync signal estimated by the eleventh means is different from the sync signal to which said one of the sub patterns in the second sync pattern is assigned.

15. An apparatus for detecting sync signals having different patterns respectively, the apparatus comprising:
   first means for comparing a pattern of an input sync signal with sub patterns in a first sync pattern to determine whether or not the pattern of the input sync signal agrees with one of the sub patterns in the first sync pattern, wherein the sub patterns in the first sync pattern are equal to the patterns of the sync signals respectively;
   second means for, in a case where the first means determines that the pattern of the input sync signal agrees with none of the sub patterns in the first sync pattern, comparing the pattern of the input sync signal with sub patterns in a second sync pattern to determine whether or not the pattern of the input sync signal agrees with one of the sub patterns in the second sync pattern, wherein the sub patterns in the second sync pattern have temporal fluctuations with respect to the patterns of the sync signals, and each of the sub patterns in the second sync pattern is assigned to only one of the sync signals;

third means for determining that a sync signal is detected in one of (1) a case where the first means determines that the pattern of the input sync signal agrees with one of the sub patterns in the first sync pattern and (2) a case where the second means determines that the pattern of the input sync signal agrees with one of the sub patterns in the second sync pattern;

fourth means for determining whether synchronization is in a locked state or an unlocked state in response to a result of the determining by the third means;

fifth means for activating the first means when the fourth means determines that the synchronization is in the locked state;

sixth means for, in a case where the fourth means determines that the synchronization is in the unlocked state, comparing the pattern of the input sync signal with the sub patterns in the first sync pattern to determine whether or not the pattern of the input sync signal agrees with one of the sub patterns in the first sync pattern;

seventh means for determining that a sync signal is detected in a case where the sixth means determines that the pattern of the input sync signal agrees with one of the sub patterns in the first sync pattern; and eighth means for determining that a sync signal is not detected in a case where the sixth means determines that the pattern of the input sync signal agrees with none of the sub patterns in the first sync pattern.

* * * * *